(12) United States Patent
Hotta et al.

(10) Patent No.: US 10,256,495 B2
(45) Date of Patent: Apr. 9, 2019

(54) FUEL CELL AND FUEL CELL STACK

(75) Inventors: Nobuyuki Hotta, Konan (JP); Daisuke Komatsu, Nagoya (JP); Naoto Matsui, Nagoya (JP); Shinobu Okazaki, Iwakura (JP); Hideki Uematsu, Konan (JP); Hiroya Ishikawa, Aichi-ken (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 470 days.

(21) Appl. No.: 14/237,228

(22) PCT Filed: Aug. 7, 2012

(86) PCT No.: PCT/JP2012/005021
§ 371 (c)(1),
(2), (4) Date: Feb. 5, 2014

(87) PCT Pub. No.: WO2013/021629
PCT Pub. Date: Feb. 14, 2013

(65) Prior Publication Data
US 2014/0170522 A1    Jun. 19, 2014

(30) Foreign Application Priority Data

Aug. 9, 2011    (JP) .................................. 2011-174286

(51) Int. Cl.
*H01M 8/02* (2016.01)
*H01M 8/2483* (2016.01)
(Continued)

(52) U.S. Cl.
CPC ....... *H01M 8/2483* (2016.02); *H01M 8/0247* (2013.01); *H01M 8/0273* (2013.01);
(Continued)

(58) Field of Classification Search
CPC ............. H01M 8/1213; H01M 8/0427; H01M 8/2465; H01M 8/0297; H01M 8/0202; H01M 8/2425
See application file for complete search history.

(56) References Cited

U.S. PATENT DOCUMENTS 4,753,857 A    6/1988  Hosaka
5,424,144 A    6/1995  Woods, Jr.
(Continued)

FOREIGN PATENT DOCUMENTS

CN            1677714 A      10/2005
DE   10 2004 044 685 A1      5/2005
(Continued)

OTHER PUBLICATIONS

English Translation: JP-2010-140656.*
(Continued)

*Primary Examiner* — Stephen J Yanchuk
(74) *Attorney, Agent, or Firm* — Sughrue Mion, PLLC

(57) ABSTRACT

A fuel cell includes a pair of interconnectors (ICs); a cell main body provided between the ICs and including an electrolyte, a cathode and an anode formed on respective surfaces of the electrolyte; and a current collection member provided between at least one of the cathode and the anode and the IC for electrically connecting the cathode and/or the anode and the IC. The current collection member has a connector abutment portion which abuts the IC, a cell main body abutment portion abutting the cell main body, and a connection portion connecting the connector abutment portion and the cell main body abutment portion, the portions being continuously formed. Between the cell main body and the IC, a spacer is provided so as to separate the connector abutment portion and the cell main body abutment portion.

40 Claims, 28 Drawing Sheets

(51) Int. Cl.

| | | |
|---|---|---|
| *H01M 8/0273* | (2016.01) | |
| *H01M 8/2457* | (2016.01) | |
| *H01M 8/1213* | (2016.01) | |
| *H01M 8/2425* | (2016.01) | |
| *H01M 8/2465* | (2016.01) | |
| *H01M 8/0297* | (2016.01) | |
| *H01M 8/0247* | (2016.01) | |

(52) U.S. Cl.
CPC ....... *H01M 8/0297* (2013.01); *H01M 8/1213* (2013.01); *H01M 8/2425* (2013.01); *H01M 8/2457* (2016.02); *H01M 8/2465* (2013.01)

(56) References Cited

U.S. PATENT DOCUMENTS

| | | | |
|---|---|---|---|
| 5,472,801 A | 12/1995 | Mattejat et al. | |
| 2003/0059668 A1* | 3/2003 | Visco .................. | B01D 53/326 429/486 |
| 2004/0209150 A1 | 10/2004 | Rock et al. | |
| 2004/0247987 A1 | 12/2004 | Izumi et al. | |
| 2005/0118481 A1 | 6/2005 | Sakano et al. | |
| 2005/0221146 A1 | 10/2005 | Horiguchi | |
| 2006/0035128 A1* | 2/2006 | Draper .................. | H01M 8/02 429/465 |
| 2007/0111055 A1 | 5/2007 | Katikaneni et al. | |
| 2009/0087714 A1 | 4/2009 | Hama et al. | |
| 2009/0226786 A1* | 9/2009 | Selcuk .................. | H01M 8/021 429/454 |
| 2011/0123893 A1 | 5/2011 | Lundblad et al. | |
| 2014/0170522 A1 | 6/2014 | Hotta et al. | |

FOREIGN PATENT DOCUMENTS

| | | |
|---|---|---|
| EP | 0424691 A1 | 5/1991 |
| EP | 0446680 A1 | 9/1991 |
| EP | 0591800 A1 | 4/1994 |
| EP | 1770807 A1 | 4/2007 |
| EP | 1850414 A2 | 10/2007 |
| EP | 2 744 026 A1 | 6/2014 |
| GB | 2434691 A | 8/2007 |
| JP | 6-203853 A | 7/1994 |
| JP | 2007-35498 A | 2/2007 |
| JP | 2007-95320 A | 4/2007 |
| JP | 2009-266533 A | 11/2009 |
| JP | 2010-140656 A | 6/2010 |
| WO | 2009025614 A1 | 2/2009 |
| WO | 2011076342 A1 | 6/2011 |

OTHER PUBLICATIONS

Office Action dated Apr. 27, 2015 issued by the Canadian Intellectual Property Office in counterpart Canadian Patent Application No. 2,843,676.
Communication dated Jun. 5, 2015 by the European Patent Office in related Application No. 12822416.9.
Office Action dated Aug. 13, 2015, issued by the State Intellectual Property Office of P.R. China in counterpart Chinese Application No. 201280038873.0.
International Search Report (PCT/ISA/210), dated Sep. 18, 2012, issued by the International Searching Authority in counterpart International Patent Application No. PCT/JP2012/005021.
Written Opinion (PCT/ISA/237), dated Sep. 18, 2012, issued by the International Searching Authority in counterpart International Patent Application No. PCT/JP2012/005021.
Search Report dated Oct. 13, 2015 issued by European Patent Office in counterpart European Patent Application No. 12822416.9.

\* cited by examiner

FUEL CELL AND FUEL CELL STACK

CROSS REFERENCE TO RELATED APPLICATIONS

This application is a National Stage of International Application No. PCT/JP2012/005021 filed Aug. 7, 2012, claiming priority based on Japanese Patent Application No. 2011-174286 filed Aug. 9, 2011, the contents of all of which are incorporated herein by reference in their entirety.

TECHNICAL FIELD

The present invention relates to a fuel cell including an electrolyte layer, and two electrodes provided on the respective surfaces of the electrolyte layer, in which a fuel gas is supplied to one of the electrodes (hereinafter may be referred to as "anode"), and an oxidant gas is supplied to the other electrode (hereinafter may be referred to as "cathode"), to thereby generate electric power; and to a fuel cell stack including a plurality of the fuel cells which are stacked and fixed together.

BACKGROUND ART

Hitherto, there has been provided a fuel cell as described in, for example, Patent Document 1, the fuel cell including a pair of interconnectors; a cell main body which is provided between the interconnectors, and which has a cathode formed on one surface of an electrolyte and has an anode formed on the other surface of the electrolyte; and a current collection member provided between the cathode and the interconnector or between the anode and the interconnector, so as to establish electrical connection between the cathode and the interconnector or between the anode and the interconnector.

The current collection member of this fuel cell has a structure including a claw-shaped elastic member provided on a flat power collection plate through cutting of the plate. In this fuel cell, electrical connection is established between the electrode and the interconnector by bonding the flat surface of the power collection plate to the interconnector, and bringing a tip end of the elastic member into contact with the cell main body.

PRIOR ART DOCUMENT

Patent Document

Patent Document 1: Japanese Patent Application Laid-Open (kokai) No. 2009-266533

SUMMARY OF THE INVENTION

Problems to be Solved by the Invention

In the case of the aforementioned conventional fuel cell, in which the current collection member is brought into contact with the cell main body by means of elasticity of the electrically conductive elastic member, a specific contact force required for electrical connection may fail to be achieved, due to, for example, plastic deformation of the current collection member through long-term use of the fuel cell, a reduction in strength of the electrically conductive elastic member caused by high temperature during power generation, and creep deformation which affects the electrically conductive elastic member. In such a case, the electrically conductive elastic member may fail to follow deformation of the cell main body resulting from, for example, a temperature cycle or a change in fuel or air pressure, which may cause unreliable contact between the elastic member and the cell main body; i.e., unreliable electrical connection between the cathode and the interconnector or between the anode and the interconnector.

When the contact force of the aforementioned elastic member required for electrical connection is reduced due to multiple factors, a portion of the elastic member, which must come into contact with the cell main body, may come into contact with the interconnector. Meanwhile, in many cases, the current collection member is formed of a material which can provide good bondability to the interconnector, since the flat surface of the member is bonded to the interconnector. Therefore, when the elastic member comes into contact with the interconnector at high temperature during power generation, the elastic member may be bonded to the interconnector through sintering. In such a case, since the elastic member is integrated with the interconnector, difficulty may be encountered in bringing the elastic member into contact with the cell main body, resulting in unreliable electrical connection between the cathode and the interconnector or between the anode and the interconnector.

In view of the foregoing, an object of the present invention is to provide a fuel cell or fuel cell stack which can maintain favorable electrical connection even after long-term use thereof.

Means for Solving the Problems

In order to achieve the aforementioned object, the present invention provides, as described in claim 1, a fuel cell comprising: a pair of interconnectors;

a cell main body which is provided between the interconnectors, and which includes an electrolyte, a cathode formed on one surface of the electrolyte, and an anode formed on the other surface of the electrolyte; and a current collection member which is provided between at least one of the cathode and the anode, and the interconnector, and which electrically connects the cathode and/or the anode, and the interconnector, wherein the current collection member has a connector abutment portion which abuts the interconnector, a cell main body abutment portion which abuts the cell main body, and a connection portion which connects the connector abutment portion and the cell main body abutment portion, the portions being continuously formed; and, between the cell main body and the interconnector, a spacer is provided so as to separate the connector abutment portion and the cell main body abutment portion from each other.

There is also provided, as described in claim 2, a fuel cell according to claim 1, wherein the connection portion is bent at about 180°, and the connector abutment portion and the cell main body abutment portion are provided on opposite sides of the spacer.

The present invention also provides, as described in claim 3, a fuel cell comprising: a pair of interconnectors;

a cell main body which is provided between the interconnectors, and which includes an electrolyte, a cathode formed on one surface of the electrolyte, and an anode formed on the other surface of the electrolyte; and a current collection member which is provided between at least one of the cathode and the anode, and the interconnector, and which electrically connects the cathode and/or the anode, and the interconnector, wherein the current collection member has a connector abutment portion which abuts the interconnector, a cell main body abutment portion which abuts the cell main body, and a connection portion which connects the connector abutment portion and the cell main body abutment portion, the portions being continuously formed; and, between the cell main body and the interconnector, a spacer is provided so as to separate the connector abutment portion and the cell main body from each other, and the spacer is also provided so as to separate the cell main body abutment portion and the interconnector from each other.

The present invention also provides, as described in claim 4, a fuel cell comprising: a pair of interconnectors;

a cell main body which is provided between the interconnectors, and which includes an electrolyte, a cathode formed on one surface of the electrolyte, and an anode formed on the other surface of the electrolyte; and a current collection member which is provided between at least one of the cathode and the anode, and the interconnector, and which electrically connects the cathode and/or the anode, and the interconnector, wherein the current collection member has a connector abutment portion which abuts the interconnector, a cell main body abutment portion which abuts the cell main body, and a connection portion which connects the connector abutment portion and the cell main body abutment portion, the portions being continuously formed; and, between the cell main body and the interconnector, a spacer is provided so as to separate the connector abutment portion and the cell main body from each other, or to separate the cell main body abutment portion and the interconnector from each other.

The present invention also provides, as described in claim 5, a fuel cell comprising: a pair of interconnectors;

a cell main body which is provided between the interconnectors so as to be a distance away from each of the interconnectors, and which includes a plate-like electrolyte, and electrodes provided on upper and lower surfaces of the electrolyte; and a current collection member which is provided between at least one of the electrodes, and the interconnector, and which electrically connects the electrode and the interconnector, wherein the current collection member has a connector abutment portion which abuts the interconnector, a cell main body abutment portion which abuts the electrode of the cell main body, and a connection portion which connects the connector abutment portion and the cell main body abutment portion, the portions being continuously formed; a spacer is provided between the connector abutment portion and the cell main body abutment portion; and each of the current collection member and the spacer exhibits elasticity in a direction of increasing the distance between the cell main body and the interconnector, and the elastic deformation of the spacer is greater than that of the current collection member.

As used herein, the term "elasticity" refers to the property of a material to deform through application of an external force thereto, and to recover its original shape through removal of the external force. As described above, the elastic deformation of the spacer is greater than that of the current collection member. In the present invention, the elastic deformation of a sample having the same shape as actually used is determined on the basis of the amount of displacement, in a thickness direction, of the sample when a load is applied thereto in a thickness direction under specific conditions, followed by removal of the load. The greater the amount of displacement of a sample in a thickness direction, the greater the elastic deformation thereof, whereas the smaller the amount of displacement of a sample in a thickness direction, the smaller the elastic deformation thereof.

There is also provided, as described in claim 6, a fuel cell according to claim 5, wherein the connection portion is bent at about 180°, and the connector abutment portion and the cell main body abutment portion are provided on opposite sides of the spacer.

The present invention also provides, as described in claim 7, a fuel cell comprising: a pair of interconnectors;

a cell main body which is provided between the interconnectors so as to be a distance away from each of the interconnectors, and which includes a plate-like electrolyte, and electrodes provided on upper and lower surfaces of the electrolyte; and a current collection member which is provided between at least one of the electrodes, and the interconnector, and which electrically connects the electrode and the interconnector, wherein the current collection member has a connector abutment portion which abuts the interconnector, a cell main body abutment portion which abuts the electrode of the cell main body, and a connection portion which connects the connector abutment portion and the cell main body abutment portion, the portions being continuously formed;

a spacer is provided between the connector abutment portion and the cell main body, and the spacer is also provided between the cell main body abutment portion and the interconnector; and each of the current collection member and the spacer exhibits elasticity in a direction of increasing the distance between the cell main body and the interconnector, and the elastic deformation of the spacer is greater than that of the current collection member.

The present invention also provides, as described in claim 8, a fuel cell comprising: a pair of interconnectors;

a cell main body which is provided between the interconnectors so as to be a distance away from each of the interconnectors, and which includes a plate-like electrolyte, and electrodes provided on upper and lower surfaces of the electrolyte; and a current collection member which is provided between at least one of the electrodes, and the interconnector, and which electrically connects the electrode and the interconnector, wherein the current collection member has a connector abutment portion which abuts the interconnector, a cell main body abutment portion which abuts the electrode of the cell main body, and a connection portion which connects the connector abutment portion and the cell main body abutment portion, the portions being continuously formed;

a spacer is provided between the connector abutment portion and the cell main body, or between the cell main body abutment portion and the interconnector; and each of the current collection member and the spacer exhibits elasticity in a direction of increasing the distance between the cell main body and the interconnector, and the elastic deformation of the spacer is greater than that of the current collection member.

There is also provided, as described in claim 9, a fuel cell according to any of claims 1 to 4, wherein the spacer is more flexible than the current collection member with respect to a load which can occur in association with a change in distance between the cell main body and the interconnector.

There is also provided, as described in claim 10, a fuel cell according to any one of claims 5 to 8, wherein the current collection member is formed so as to be bendable and stretchable in a direction crossing with the surface direction thereof, and to generate virtually no resistive force against bending or stretching.

There is also provided, as described in claim 11, a fuel cell according to any one of claims 5 to 10, wherein the spacer is formed of at least one species selected from among mica, alumina felt, vermiculite, carbon fiber, silicon carbide fiber, and silica.

There is also provided, as described in claim 12, a fuel cell according to any one of claims 1 to 11, which further comprises a clamping member which integrally clamps the interconnector, the cell main body, and the current collection member, wherein, by means of the clamping member and the spacer, the cell main body abutment portion of the current collection member is pressed to abut the cell main body, and the connector abutment portion is pressed to abut the interconnector.

There is also provided, as described in claim 13, a fuel cell according to claim 12, wherein the spacer exhibits, in a clamping direction, a thermal expansion coefficient higher than that of the clamping member.

There is also provided, as described in claim 14, a fuel cell according to any one of claims 1 to 13, wherein the current collection member is formed of porous metal, metallic mesh, wire, or punching metal.

There is also provided, as described in claim 15, a fuel cell according to any one of claims 1 to 14, wherein the cell main body abutment portion of the current collection member is bonded to the surface of the cathode and/or the anode of the cell main body.

There is also provided, as described in claim 16, a fuel cell according to any one of claims 1 to 15, wherein the connector abutment portion of the current collection member is bonded to the interconnector.

There is also provided, as described in claim 17, a fuel cell according to any one of claims 1 to 16, wherein the current collection member is provided between the anode and the interconnector, and is formed of Ni or an Ni alloy.

The present invention also provides, as described in claim 18, a fuel cell stack comprising a plurality of fuel cells as recited in any one of claims 1 to 17, the fuel cells being stacked and fixed together by means of the clamping member.

Effects of the Invention

According to the fuel cell as described in claim 1 or 2, since deformation of the connector abutment portion and the cell main body abutment portion in an anti-contact direction (i.e., in a direction in which they do not abut each other) is suppressed by means of the spacer, the current collection member is less likely to be plastic-deformed, and is less likely to be affected by, for example, a reduction in strength caused by high temperature during power generation, or creep deformation. In addition, since the spacer is provided between the connector abutment portion and the cell main body abutment portion of the current collection member so as to prevent contact therebetween, the connector abutment portion and the cell main body abutment portion are prevented from being bonded together through sintering at high temperature (operating temperature region of the fuel cell) during power generation. Thus, there can be prevented integration (i.e., bonding through sintering) of the connector abutment portion and the cell main body abutment portion, and unreliable electrical connection in association therewith.

According to the fuel cell as described in claim 3, since deformation of the connector abutment portion and the cell main body abutment portion of the current collection member in an anti-contact direction (i.e., in a direction in which they do not abut each other) is suppressed by means of the spacer, the current collection member is less likely to be plastic-deformed, and is less likely to be affected by, for example, a reduction in strength caused by high temperature during power generation, or creep deformation. In addition, since the spacer is provided between the connector abutment portion of the current collection member and the cell main body so as to prevent contact therebetween, and also between the cell main body abutment portion and the interconnector so as to prevent contact therebetween, the connector abutment portion and the cell main body, as well as the cell main body abutment portion and the interconnector, are prevented from being bonded together through sintering at high temperature during power generation. Thus, there can be prevented integration (i.e., bonding through sintering) of the connector abutment portion and the cell main body, and the cell main body abutment portion and the interconnector, and also unreliable electrical connection in association therewith.

According to the fuel cell as described in claim 4, since deformation of the connector abutment portion and the cell main body abutment portion of the current collection member in an anti-contact direction (i.e., in a direction in which they do not abut each other) is suppressed by means of the spacer, the current collection member is less likely to be affected by, for example, a reduction in strength caused by high temperature during power generation, or creep deformation. In addition, since the spacer is provided between the connector abutment portion of the current collection member and the cell main body or between the cell main body abutment portion and the interconnector so as to prevent contact therebetween, the connector abutment portion and the cell main body, or the cell main body abutment portion and the interconnector are prevented from being bonded together through sintering at high temperature during power generation. Thus, there can be prevented integration (i.e., bonding through sintering) of the connector abutment portion and the cell main body, or the cell main body abutment portion and the interconnector, and unreliable electrical connection in association therewith.

According to the fuel cell as described in claim 9, since the spacer is designed so as to be more flexible than the current collection member, and to exhibit low resistive force against a load applied thereto, there can be prevented breakage of the cell main body, which would otherwise be induced by excessive resistive force from the spacer during operation of the fuel cell or assembly of the fuel cell. That is, the spacer exhibits cushion performance, and thus reduces deformation of the cell main body during operation of the fuel cell, or concentration of stress onto the cell main body, which occurs due to clamping force during assembly of the fuel cell, whereby breakage of the cell main body can be suppressed. The spacer may be formed of at least a material as described in claim 11.

According to the fuel cell as described in claim 5 or 6, since the spacer is provided between the connector abutment portion and the cell main body abutment portion of the current collection member so as to prevent contact therebetween, the connector abutment portion and the cell main body abutment portion are prevented from being bonded together through sintering at high temperature (operating temperature region of the fuel battery) during power generation. Thus, there can be prevented integration (i.e., bonding through sintering) of the connector abutment portion and the cell main body abutment portion, and unreliable electrical connection in association therewith.

According to the fuel cell as described in claim 7, since the spacer is provided between the connector abutment portion of the current collection member and the cell main body so as to prevent contact therebetween, and also between the cell main body abutment portion and the interconnector so as to prevent contact therebetween, the connector abutment portion and the cell main body, as well as the cell main body abutment portion and the interconnector, are prevented from being bonded together through sintering at high temperature during power generation. Thus, there can be prevented integration (i.e., bonding through sintering) of the connector abutment portion and the cell main body, and the cell main body abutment portion and the interconnector, and also unreliable electrical connection in association therewith.

According to the fuel cell as described in claim 8, since the spacer is provided between the connector abutment portion of the current collection member and the cell main body or between the cell main body abutment portion and the interconnector so as to prevent contact therebetween, the connector abutment portion and the cell main body, or the cell main body abutment portion and the interconnector are prevented from being bonded together through sintering at high temperature during power generation. Thus, there can be prevented integration (i.e., bonding through sintering) of the connector abutment portion and the cell main body, or the cell main body abutment portion and the interconnector, and unreliable electrical connection in association therewith.

The fuel cell as described in any of claims 5 to 8 exhibits the following effects.

(i) When the cell main body, etc. are deformed through, for example, a thermal cycle, and the distance between the interconnector and the electrode is increased; i.e., when the space in which the current collection member is provided is increased, since the elastic deformation of the spacer is large, reliable electrical connection is established between the interconnector and the electrode. In addition, even when the space in which the current collection member is provided is temporarily reduced and then is increased, since the elastic deformation of the spacer is greater than that of the current collection member, reliable electrical connection can be established between the interconnector and the electrode.

(ii) Since the spacer is flexible in a compression direction, there is no probability that breakage of the cell main body is induced by excessive resistive force from the spacer. That is, the spacer exhibits cushion performance, and thus reduces concentration of stress onto the cell main body, which occurs due to clamping force during assembly of the fuel cell, whereby breakage of the cell main body can be suppressed.

When, as described in claim 10, the current collection member is formed so as to be bendable and stretchable in a direction crossing with the surface direction thereof, and to generate virtually no resistive force against bending or stretching, there is a clear distinction between the role of the spacer and the current collection member; specifically, the spacer corresponds to deformation of the cell main body resulting from, for example, a temperature cycle or a change in fuel or air pressure, and the current collection member corresponds to electrical connection. Therefore, the material and shape of each of the spacer and the current collection member can be optimized in association with its role.

The aforementioned spacer may be formed of at least a material as described in claim 11.

According to the fuel cell as described in claim 12, since the interconnector, the cell main body, and the current collection member are stacked and clamped together by means of the clamping member, the cell main body abutment portion of the current collection member reliably abuts the cell main body by means of the pressing force of the spacer, or the connector abutment portion reliably abuts the interconnector by means of the pressing force of the spacer. Therefore, reliable electrical connection is established by the current collection member.

That is, a reduction in elastic force of the current collection member (which is affected by creep deformation of the metallic current collection member at high temperature) is compensated by the elastic force of the spacer, and thus the pressing effect to the cell main body or the interconnector is maintained. Therefore, contact points are maintained in a favorable state.

According to the fuel cell as described in claim 13, since the spacer exhibits, in a clamping direction, a thermal expansion coefficient higher than that of the clamping member. Therefore, even when thermal expansion of the clamping member by heat during power generation causes a reduction in force of clamping the interconnector, the cell main body, and the current collection member, the pressing effect to the current collection member is maintained, since the spacer thermally expands to an extent greater than that of thermal expansion of the clamping member.

When, as described in claim 14, the current collection member is formed of porous metal, metallic mesh, wire, or punching metal, the current collection member exhibits improved fuel gas or oxidant gas diffusibility, as compared with the case where it is formed of a simple plate material.

When, as described in claim 15, the cell main body abutment portion is bonded to the surface of the cathode and/or the anode of the cell main body, the cell main body abutment portion can follow deformation of the cell main body resulting from, for example, a temperature cycle or a change in fuel or air pressure, and thus reliable electrical connection is achieved.

In the case where, as described in claim 16, the connector abutment portion of the current collection member is bonded to the interconnector, even when the cell main body is deformed as a result of, for example, a temperature cycle or a change in fuel or air pressure, reliable electrical connection can be maintained between the connector abutment portion and the interconnector.

When, as described in claim 17, the current collection member is provided between the anode and the interconnector, and is formed of Ni or an Ni alloy, the cell main body abutment portion or the connector abutment portion of the current collection member can be bonded to the anode of the cell main body or the interconnector only through heating of the fuel cell after assembly thereof.

Specifically, Ni or an Ni alloy is a material exhibiting excellent bondability to the anode of the cell main body or the interconnector, and the cell main body abutment portion or the connector abutment portion of the current collection member is reliably in contact with the cell main body or the interconnector by means of the elasticity of the current collection member itself or the pressing force of the spacer. Therefore, when the fuel cell is heated after completion of assembly thereof, the cell main body abutment portion is diffusion-bonded to Ni contained in the anode of the cell main body, or the connector abutment portion is integrated with the interconnector through diffusion bonding. Thus, when the cell main body abutment portion or the connector abutment portion is respectively integrated with the cell main body or the interconnector, reliable electrical connection is established between the cell main body and the interconnector.

Since the temperature of the fuel battery reaches 700° C. or thereabouts to 1,000° C. during power generation, the cell main body abutment portion or the connector abutment portion can be respectively bonded to the anode of the cell main body or the interconnector by means of heat during power generation. Therefore, a heating process can be omitted, leading to energy saving.

The fuel cell stack as described in claim 18 is produced by stacking a plurality of fuel cells as recited in any one of claims 1 to 17, and fixing the fuel cells by means of the clamping member. Therefore, the fuel cell stack can maintain favorable electrical connection even after long-term use thereof.

MODES FOR CARRYING OUT THE INVENTION

Figure 1:
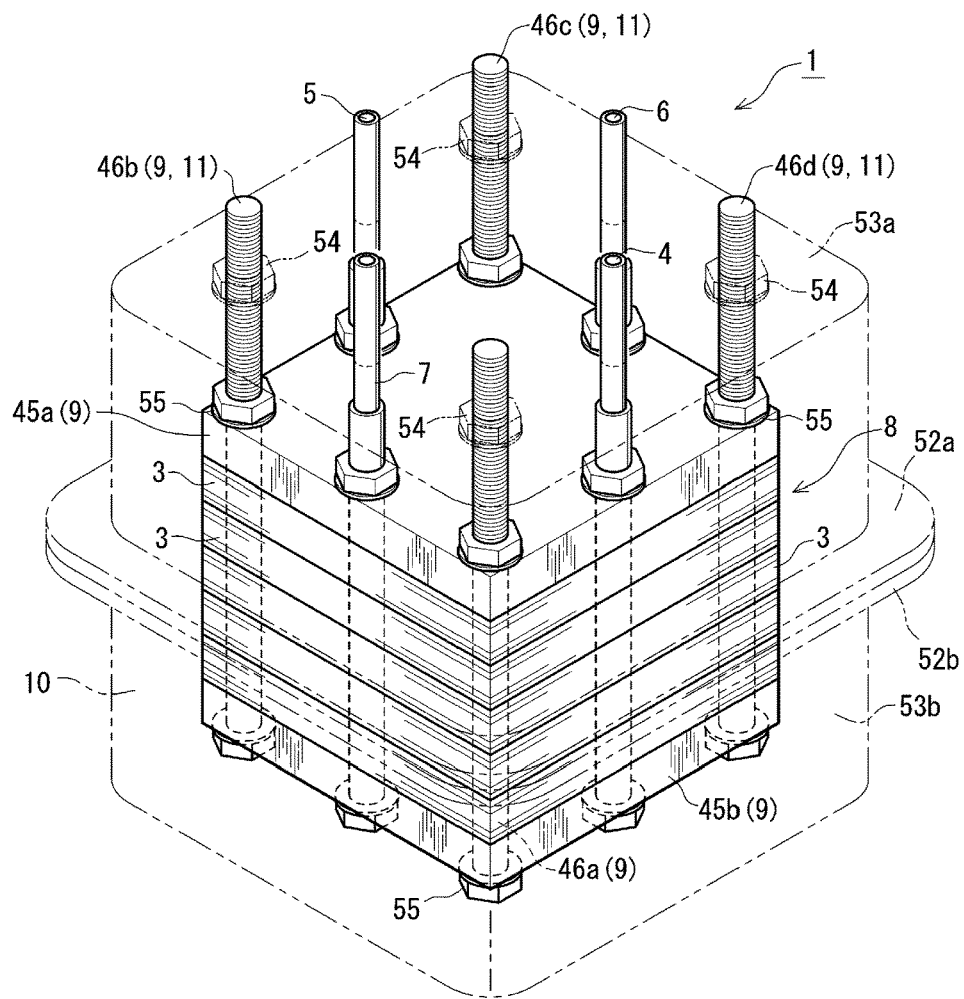
FIG. 1 is a perspective view of a fuel battery according to Embodiment 1.
Figure 2:
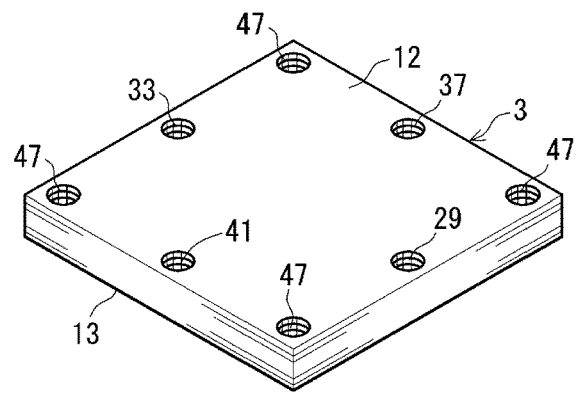
FIG. 2 is a perspective view of a fuel cell according to Embodiment 1.

Currently used fuel cells are roughly classified, in terms of the material of an electrolyte, into four types: a polymer electrolyte fuel cell (PEFC) including a polymer electrolyte membrane serving as an electrolyte; a phosphoric acid fuel cell (PAFC) including an electrolyte formed of phosphoric acid; a molten carbonate fuel cell (MCFC) including an electrolyte formed of a Li—Na/K carbonate; and a solid oxide fuel cell (SOFC) including an electrolyte formed of, for example, a $ZrO_2$ ceramic material. The operating temperatures (i.e., temperatures at which ions can migrate through the electrolyte) of these types of fuel cells differ from one another. Currently, the operating temperatures of PEFC, PAFC, MCFC, and SOFC are ambient temperature to about 90° C., about 150° C. to 200° C., about 650° C. to 700° C., and about 700° C. to 1,000° C., respectively.

Embodiment 1

A fuel battery 1 according to Embodiment 1 shown in FIGS. 1 to 11 is an SOFC including an electrolyte 2 formed of, for example, a $ZrO_2$ ceramic material. The fuel battery 1 generally includes a fuel cell 3 serving as a minimum unit for power generation; an air supply path 4 for supplying air to the fuel cell 3; an air discharge path 5 for discharging air to the outside; a fuel supply path 6 for supplying a fuel gas to the fuel cell 3; a fuel discharge path 7 for discharging the fuel gas to the outside; a fixing member 9 for fixing a cell group prepared through stacking of a plurality of the fuel cells 3, to thereby produce a fuel cell stack 8; a container 10 for accommodating the fuel cell stack 8; and an output member 11 for outputting electric power generated by the fuel cell stack 8.

[Fuel Cell]

Figure 3:
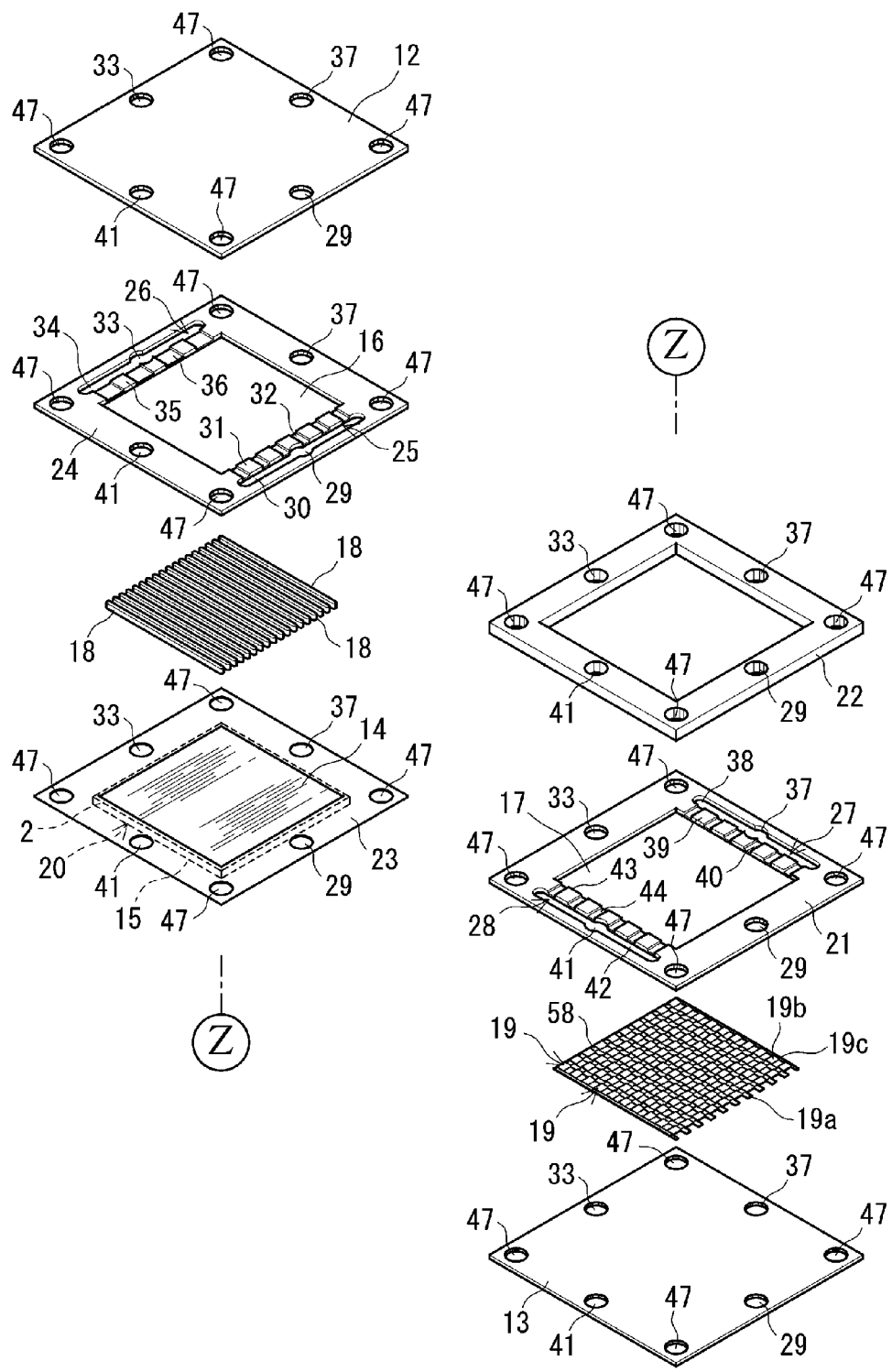
FIG. 3 is an exploded perspective view of the fuel cell according to Embodiment 1.

The fuel cell 3 has a square shape in plan view. As shown in FIG. 3, the fuel cell 3 includes an upper interconnector 12 which is in square plate form and is formed of, for example, electrically conductive ferrite stainless steel (note: for the sake of convenience of description, the term "upper" or "lower" as used herein is based on the drawings, but does not refer to the absolute vertical position, the same shall apply hereinafter); a lower interconnector 13 which is also in square plate form and is formed of, for example, electrically conductive ferrite stainless steel; a cell main body 20 which is located generally at the middle between the upper and lower interconnectors 12 and 13, which has a cathode 14 formed on a surface of an electrolyte 2 facing the inner surface (lower surface) of the upper interconnector 12, and which has an anode 15 formed on a surface of the electrolyte 2 facing the inner surface (upper surface) of the lower interconnector 13; an air chamber 16 formed between the upper interconnector 12 and the cathode 14; a fuel chamber 17 formed between the lower interconnector 13 and the anode 15; a current collection member 18 (on the side toward the cathode 14) which is provided inside of the air chamber 16 and which electrically connects the cathode 14 and the upper interconnector 12; and a current collection member 19 (on the side toward the anode 15) which is provided inside of the fuel chamber 17 and which electrically connects the anode 15 and the lower interconnector 13. The square fuel cell 3 has, at the corners thereof, corner through holes 47, 47 through which the below-described clamping members 46a to 46d of the aforementioned fixing member 9 penetrate.

[Electrolyte]

The aforementioned electrolyte 2 may be formed of, for example, a $ZrO_2$ ceramic material, an $LaGaO_3$ ceramic material, a $BaCeO_3$ ceramic material, an $SrCeO_3$ ceramic material, an $SrZrO_3$ ceramic material, or a $CaZrO_3$ ceramic material.

[Anode]

The aforementioned anode 15 may be formed of a mixture of a metal such as Ni or Fe, and at least one species selected from ceramic materials such as $CeO_2$ ceramic materials and $ZrO_2$ ceramic materials (e.g., zirconia stabilized by at least one species selected from among rare earth elements such as Sc and Y). The anode 15 may be formed of a metal such as Pt, Au, Ag, Pb, Ir, Ru, Rh, Ni, or Fe. The anode 15 may be formed of only one species of these metals, or an alloy of two or more species of the metals. Alternatively, the anode 15 may be formed of a mixture of such a metal and/or an alloy thereof and at least one species of the aforementioned ceramic materials (the mixture including cermet). Alternatively, the anode 15 may be formed of, for example, a mixture an oxide of a metal such as Ni or Fe, and at least one species of the aforementioned ceramic materials.

[Cathode]

The aforementioned cathode 14 may be formed of, for example, any metal, any metal oxide, or any metal multiple oxide. Examples of the metal include metals such as Pt, Au, Ag, Pb, Ir, Ru, and Rh; and alloys containing two or more of these metals. Examples of the metal oxide include oxides of La, Sr, Ce, Co, Mn, Fe, etc. (e.g., $La_2O_3$, SrO, $Ce_2O_3$, $Co_2O_3$, $MnO_2$, and FeO). Examples of the multiple oxide include multiple oxides containing, for example, at least La, Pr, Sm, Sr, Ba, Co, Fe, Mn, etc. (e.g., $La_{1-x}Sr_xCoO_3$ multiple oxides, $La_{1-x}Sr_xFeO_3$ multiple oxides, $La_{1-x}Sr_xCo_{1-y}FeO_3$ multiple oxides, $La_{1-x}Sr_xMnO_3$ multiple oxides, $Pr_{1-x}Ba_xCoO_3$ multiple oxides, and $Sm_{1-x}Sr_xCoO_3$ multiple oxides).

[Fuel Chamber]

Figure 4:
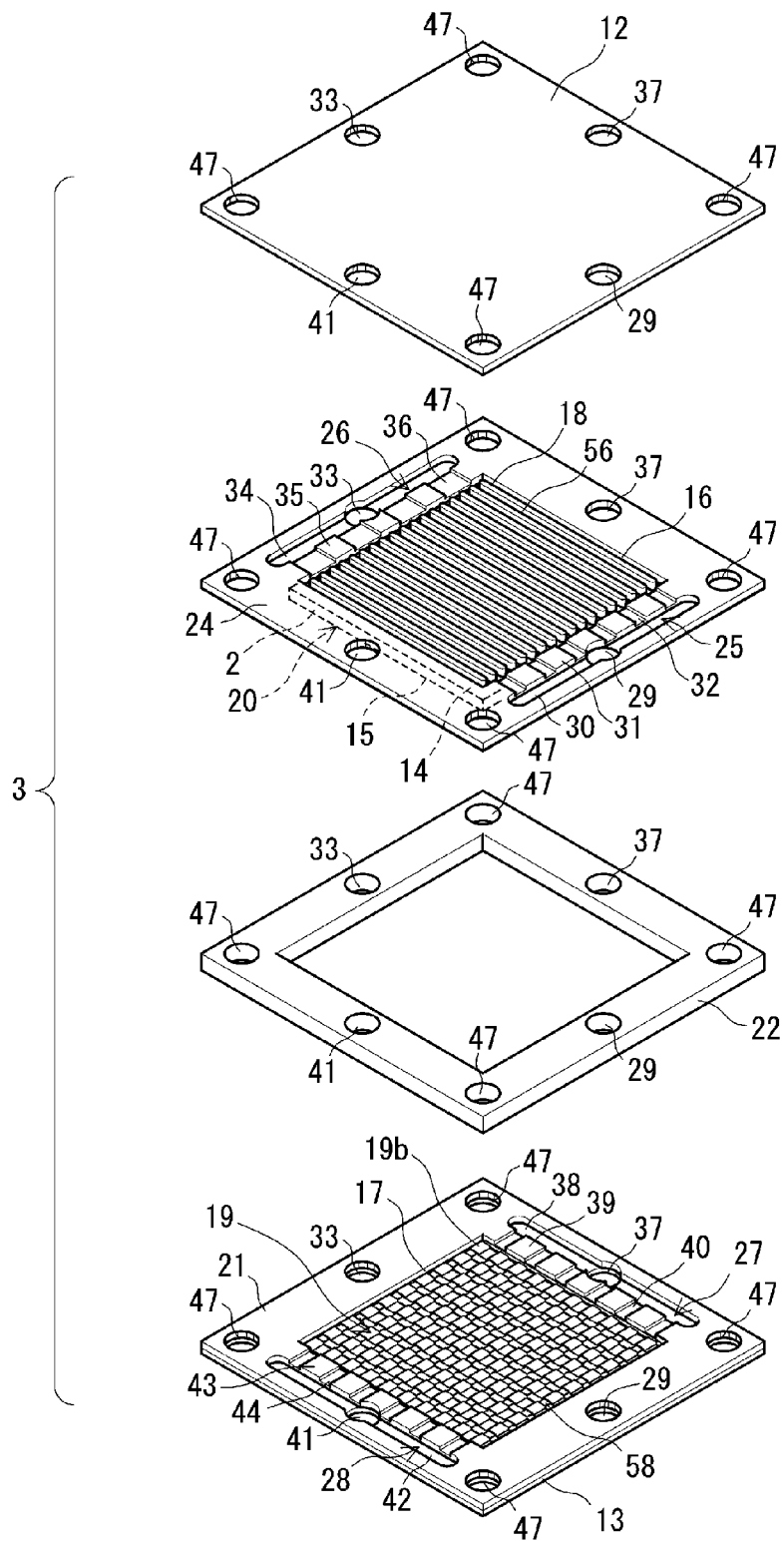
FIG. 4 is an exploded perspective view of the fuel cell according to Embodiment 1, in which some parts are not shown in an exploded manner.
Figure 5:
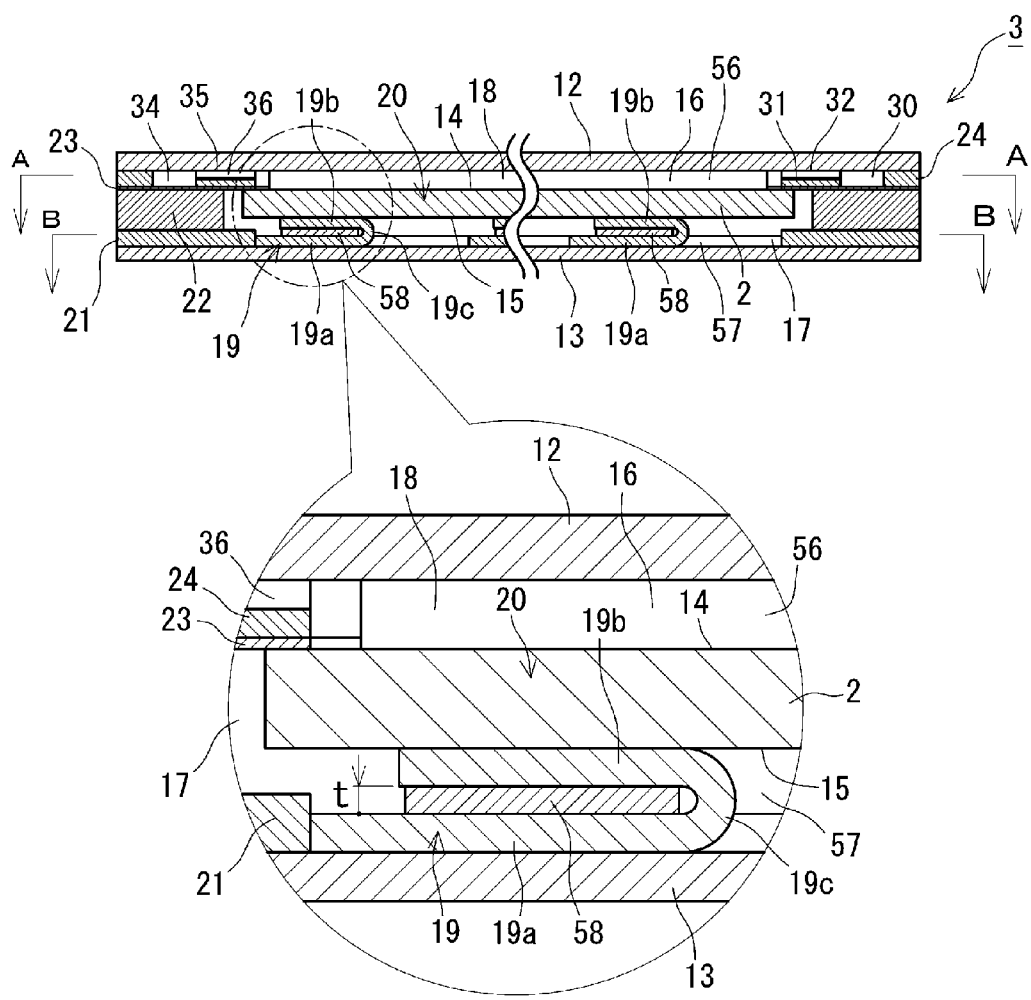
FIG. 5 is an intermediate-omitted, vertical cross-sectional view of the fuel cell according to Embodiment 1.
Figure 6:
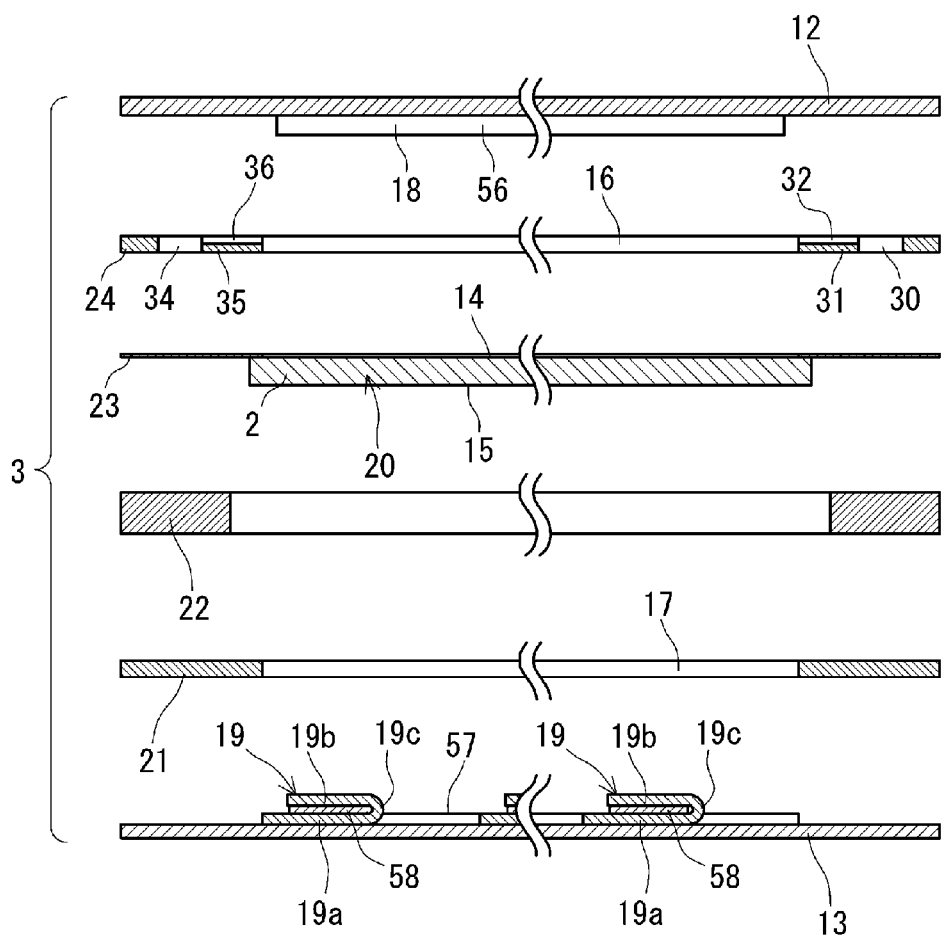
FIG. 6 is an exploded vertical cross-sectional view of the fuel cell of FIG. 5.

As shown in FIGS. 3 to 5, the fuel chamber 17, which is a square chamber, is defined by an insulating frame 21 for formation of an anode gas path (hereinafter the frame may be referred to as "anode insulating frame"), the anode insulating frame 21 surrounding the current collection member 19 and being provided on the upper surface of the lower interconnector 13, and an anode frame 22 provided on the upper surface of the anode insulating frame 21.

[Fuel-Chamber-Side Current Collection Member]

The current collection member 19 toward the side of the fuel chamber 17 is formed of, for example, an Ni plate material. The current collection member 19 has a connector abutment portion 19a which abuts the lower interconnector 13, a cell main body abutment portion 19b which abuts the anode 15 of the cell main body 20, and a U-shaped connection portion 19c which connects the connector abutment portion 19a and the cell main body abutment portion 19b, the portions 19a to 19c being continuously formed. By means of the elastic force of the U-shaped connection portion 19c, the connector abutment portion 19a and the cell main body abutment portion 19b are respectively biased toward the interconnector 13 and the cell main body 20. In addition, the current collection member 19 can flexibly follow deformation of the cell main body 20 resulting from a temperature cycle or a change in, for example, fuel pressure or air pressure.

The current collection member 19 toward the side of the fuel chamber 17 may be formed of, in place of the aforementioned plate material, for example, porous Ni, Ni mesh, Ni wire, or Ni punching metal. The current collection member 19 toward the side of the fuel chamber 17 may be formed of, in place of Ni, an oxidation-resistant metal such as an Ni alloy or stainless steel.

About several tens to one hundred current collection members 19 are provided in the fuel chamber 17 (needless to say, the number of the current collection members may vary in association with the size of the fuel chamber). The current collection members 19 may be individually arranged on the interconnector 13 and subjected to welding (e.g., laser welding or resistance welding). However, preferably, as shown in FIG. 10(*b*), the aforementioned plate material is processed into a square flat plate 19p so as to match the fuel chamber 17, and pre-cut lines 19d, each corresponding to the cell main body abutment portion 19b and the connection portion 19c, are provided on the flat plate 19p, so that, as shown in the enlarged view of FIG. 9, when the connection portion 19c is bent so as to have a U-shaped cross section, the cell main body abutment portion 19b is provided above and at a distance t from the connector abutment portion 19a (see the enlarged view of FIG. 5). Therefore, the flat plate 19p having holes corresponding to the bent cell main body abutment portions 19b corresponds to an aggregate of the connector abutment portions 19a. In this embodiment, the connector abutment portions 19a of the flat plate 19p are bonded to the lower interconnector 13 through laser welding or resistance welding.

Figure 11:
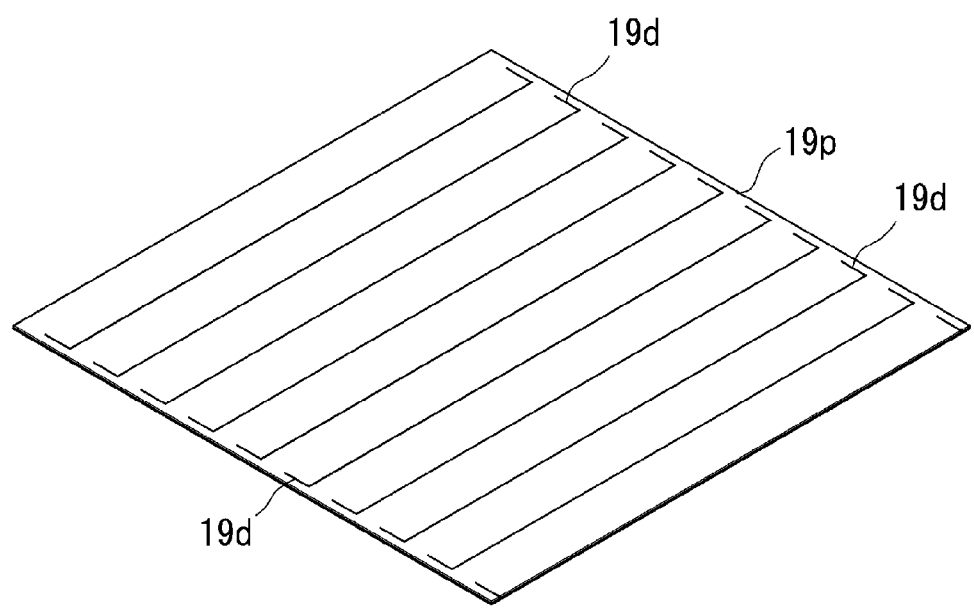
FIG. 11 is a perspective view of a current collection member, which is a modification of the current collection member of FIG. 10(b).

As shown in FIG. 11, the pre-cut lines 19d of the current collection members 19 may be formed such that the cell main body abutment portions 19b and the connection portions 19c are integrated into one row. In such a case, the cell main body abutment portions 19b and the connection portions 19c can be processed efficiently.

[Spacer]

As shown in FIG. 5, a spacer 58 is provided in the current collection member 19. In the fuel chamber 17 between the cell main body 20 and the lower interconnector 13, the spacer 58 is provided between the connector abutment portion 19a and the cell main body abutment portion 19b so as to separate them from each other. The thickness and material of the spacer 58 are determined so that the thickness thereof becomes greater than the aforementioned distance t—which increases through thermal expansion—when the spacer 58 is thermally expanded at least at the operating temperature region of the fuel battery (i.e., 700° C. to 1,000° C.), so as to press the cell main body abutment portion 19b and the connector abutment portion 19a in the respective abutment directions; i.e., to press the cell main body abutment portion 19b toward the cell main body 20, and to press the connector abutment portion 19a toward the interconnector 13.

No particular limitation is imposed on the thickness of the spacer 58, so long as it is larger than the distance t between the cell main body abutment portion 19b and the connector abutment portion 19a at the operating temperature region of the fuel battery. Preferably, the thickness of the spacer 58 is adjusted to be at least almost equal to or slightly larger than the distance t between the cell main body abutment portion 19b and the connector abutment portion 19a at ambient temperature during non-operation of the fuel battery. In such a case, reliable electrical contact can be maintained between the connector abutment portion 19a and the interconnector 13 and between the cell main body abutment portion 19b and the cell main body 20 by means of the spacer 58 until the temperature of the fuel battery reaches the operating temperature region after initiation of power generation.

The spacer 58 is formed of a material more flexible than that of the current collection member 19; i.e., a material exhibiting elasticity lower than that of the current collection member 19. Specifically, the material and structure of the spacer 58 are determined so that it follows movement of the current collection member 19 (i.e., it does not impede prompt movement of the current collection member 19) with respect to a change in size of the fuel chamber 17 resulting from a temperature cycle or a change in fuel or air pressure.

The spacer 58 is formed of a material which is not sintered to the current collection member 19 at the operating temperature region of the fuel battery. Therefore, the cell main body abutment portion 19b and the connector abutment portion 19a are not sintered together by coming into direct contact with each other, and the cell main body abutment portion 19b and the connector abutment portion 19a are not sintered to each other via the spacer 58.

The material of the spacer 58 satisfying the aforementioned conditions may be any one species or a combination of a plurality of species selected from among mica, alumina felt, vermiculite, carbon fiber, silicon carbide fiber, and silica. Preferably, the spacer 58 is formed of a laminate structure of thin plates (e.g., mica), since appropriate elasticity is imparted with respect to a load in a lamination direction. The spacer 58 formed of such a material exhibits, in a thickness direction (lamination direction), a thermal expansion coefficient higher than that (in a clamping direction) of the below-described clamping members 46a to 46d.

Thus, when elasticity is imparted to the current collection member 19 (connection member) and also to the spacer 58, contact points are maintained in a more favorable state.

As described above, the current collection member 19 of this embodiment has an integral structure formed of the flat plate 19p, which is an aggregate of the connector abutment portions 19a. Accordingly, as shown in FIG. 10(a), the spacer 58 is formed from a single square material sheet having almost the same width as the flat plate 19p and a length slightly smaller than that of the flat plate 19p (specifically, smaller by a length corresponding to a single cell main body abutment portion 19b and a single connection portion 19c), so that portions each corresponding to a single row of the cell main body abutment portions 19b and the connection portions 19c are cut out to be arranged in a transverse lattice form.

The thus-formed spacer 58 is placed on the unprocessed flat plate 19p (of the current collection member 19) shown in FIG. 10(b). Then, as shown in FIG. 9 (enlarged view), the connection portions 19c are bent so as to have a U-shaped cross section, to thereby produce the current collection member 19 in which the spacer 58 is pre-integrated.

Figure 9:
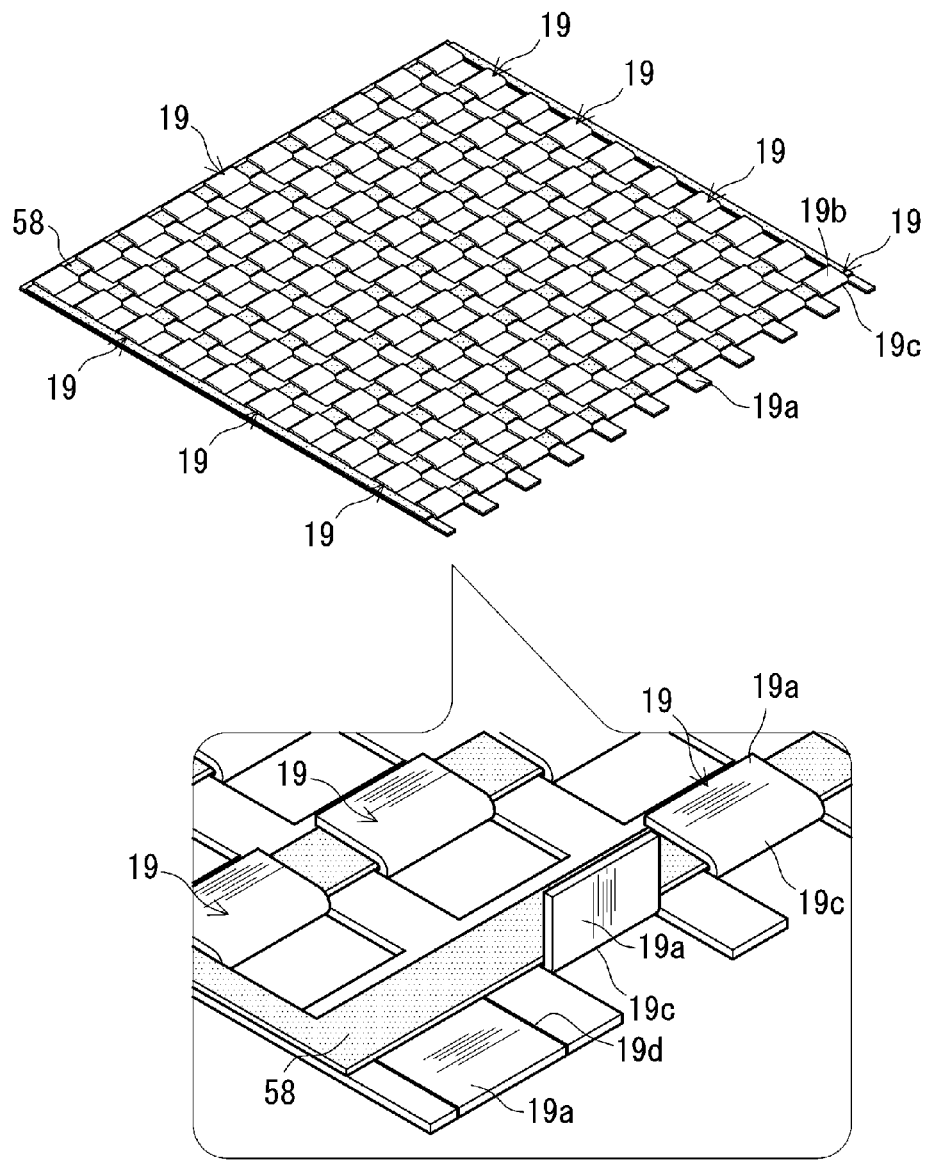
FIG. 9 is a perspective view of a current collection member according to Embodiment 1.
Figure 10:
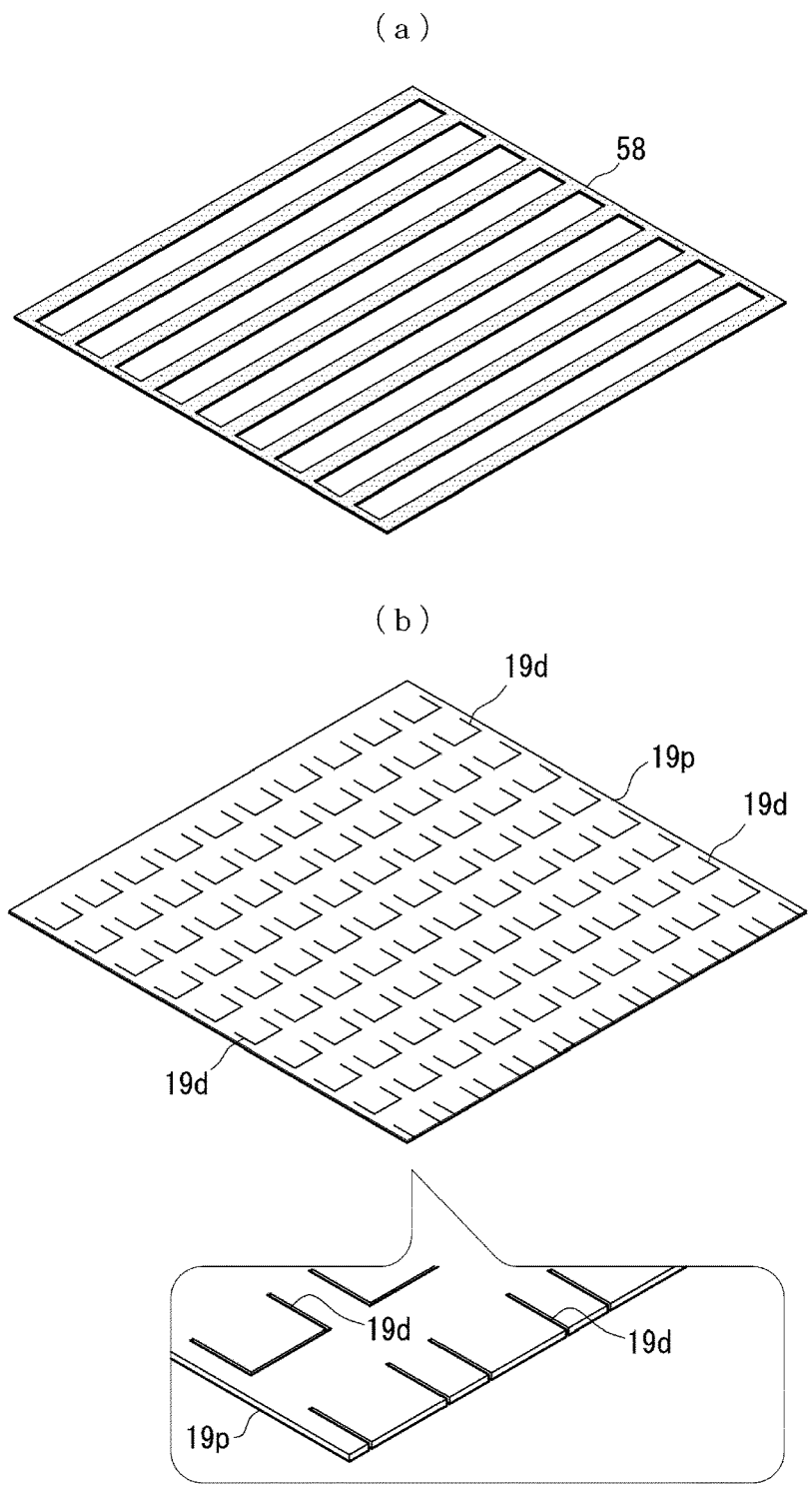
FIG. 10(a) is a perspective view of a spacer according to Embodiment 1.
FIG. 10(b) is a perspective view of the current collection member according to Embodiment 1 before attachment of the spacer.

As shown in the enlarged view of FIG. 9, the cell main body abutment portions 19b are bent in a stepwise manner from the left corner toward to the right side. However, this figure is only for the purpose of describing the production procedure. Therefore, all the cell main body abutment portions 19b may be bent simultaneously, or the cell main body abutment portions 19b may be bent sequentially from a position convenient for processing.

[Air Chamber]

As shown in FIGS. 3 to 5, the aforementioned air chamber 16, which is a square chamber, is defined by a thin metallic electrically conductive separator 23 which has a square frame shape and which has, on its lower surface, the aforementioned electrolyte 2 attached thereto, and an insulating frame 24 for formation of a cathode gas path (hereinafter the frame may be referred to as "cathode insulating frame"), the cathode insulating frame 24 surrounding the current collection member 18 and being provided between the separator 23 and the upper interconnector 12.

[Air-Chamber-Side Current Collection Member]

The current collection member 18 toward the side of the air chamber 16 is formed of, for example, a dense electrically conductive member having an elongated squared timber shape (e.g., a stainless steel material). A plurality of the current collection members 18 are arranged in parallel at certain intervals so as to abut the cathode 14 on the upper surface of the electrolyte 2 and the lower surface (inner surface) of the upper interconnector 12. The current collection member 18 toward the side the air chamber 16 may have the same structure as the current collection member 19 on the side toward the fuel chamber 17 (including the below-described Embodiment 2).

As described above, the fuel cell 3 includes the fuel chamber 17 and the air chamber 16, which are defined by a combination of the lower interconnector 13, the anode insulating frame 21, the anode frame 22, the separator 23, the cathode insulating frame 24, and the upper interconnector 12. The fuel chamber 17 and the air chamber 16 are separated from each other by means of the electrolyte 2, and the anode 15 is electrically insulated from the cathode 14 by means of the anode insulating frame 21 and the cathode insulating frame 24.

The fuel cell 3 also includes an air supply unit 25 having the air supply path 4 for supplying air to the inside of the air chamber 16; an air discharge unit 26 having the air discharge path 5 for discharging air from the air chamber 16 to the outside; a fuel supply unit 27 having the fuel supply path 6 for supplying a fuel gas to the inside of the fuel chamber 17; and a fuel discharge unit 28 having the fuel discharge path 7 for discharging the fuel gas from the fuel chamber 17 to the outside.

[Air Supply Unit]

The air supply unit 25 includes an air supply through hole 29 which is provided in a vertical direction at the center of one side of the square fuel cell 3; an elongated-hole-shaped air supply communicating chamber 30 which is provided in the cathode insulating frame 24 so as to communicate with the air supply through hole 29; an air supply communicating portion 32 which is formed of a plurality of dents provided at regular intervals on the upper surface of a partition wall 31 between the air supply communicating chamber 30 and the air chamber 16; and the air supply path 4 inserted in the air supply through hole 29 for supplying air from the outside to the air supply communicating chamber 30.

[Air Discharge Unit]

The air discharge unit 26 includes an air discharge through hole 33 which is provided in a vertical direction at the center of the side of the fuel cell 3 opposite the air supply unit 25; an elongated-hole-shaped air discharge communicating chamber 34 which is provided in the cathode insulating frame 24 so as to communicate with the air discharge through hole 33; an air discharge communicating portion 36 which is formed of a plurality of dents provided at regular intervals on the upper surface of a partition wall 35 between the air discharge communicating chamber 34 and the air chamber 16; and the tubular air discharge path 5 inserted in the air discharge through hole 33 for discharging air from the air discharge communicating chamber 34 to the outside.

[Fuel Supply Unit]

The fuel supply unit 27 includes a fuel supply through hole 37 which is provided in a vertical direction at the center of one of the remaining two sides of the square fuel cell 3; an elongated-hole-shaped fuel supply communicating chamber 38 which is provided in the anode insulating frame 21 so as to communicate with the fuel supply through hole 37; a fuel supply communicating portion 40 which is formed of a plurality of dents provided at regular intervals on the upper surface of a partition wall 39 between the fuel supply communicating chamber 38 and the fuel chamber 17; and the tubular fuel supply path 6 inserted in the fuel supply through hole 37 for supplying a fuel gas from the outside to the fuel supply communicating chamber 38.

[Fuel Discharge Unit]

The fuel discharge unit 28 includes a fuel discharge through hole 41 which is provided in a vertical direction at the center of the side of the fuel cell 3 opposite the fuel supply unit 27; an elongated-hole-shaped fuel discharge communicating chamber 42 which is provided in the anode insulating frame 21 so as to communicate with the fuel discharge through hole 41; a fuel discharge communicating portion 44 which is formed of a plurality of dents provided at regular intervals on the upper surface of a partition wall 43 between the fuel discharge communicating chamber 42 and the fuel chamber 17; and the tubular fuel discharge path 7 inserted in the fuel discharge through hole 41 for discharging the fuel gas from the fuel discharge communicating chamber 42 to the outside.

[Fuel Cell Stack]

The fuel cell stack 8 is produced by fixing, by means of the fixing member 9, a cell group prepared through stacking of a plurality of the aforementioned fuel cells 3. When a plurality of the fuel cells 3 are stacked together, the upper interconnector 12 of the fuel cell 3 located on the lower side is integrated with the lower interconnector 13 of the fuel cell 3 located on the upper-side, and the thus-integrated interconnector is shared by the upper and lower fuel cells 3, 3.

The aforementioned fixing member 9 is a combination of a pair of end plates 45a and 45b which vertically sandwich the cell group, and four clamping members 46a to 46d for clamping the end plates 45a and 45b and the cell group, each clamping member including a clamping nut and a bolt penetrating corner holes (not illustrated) of the end plates 45a and 45b and the aforementioned corner holes 47 of the cell group. The clamping members 46a to 46d are formed of, for example, Inconel 601.

Figure 7:
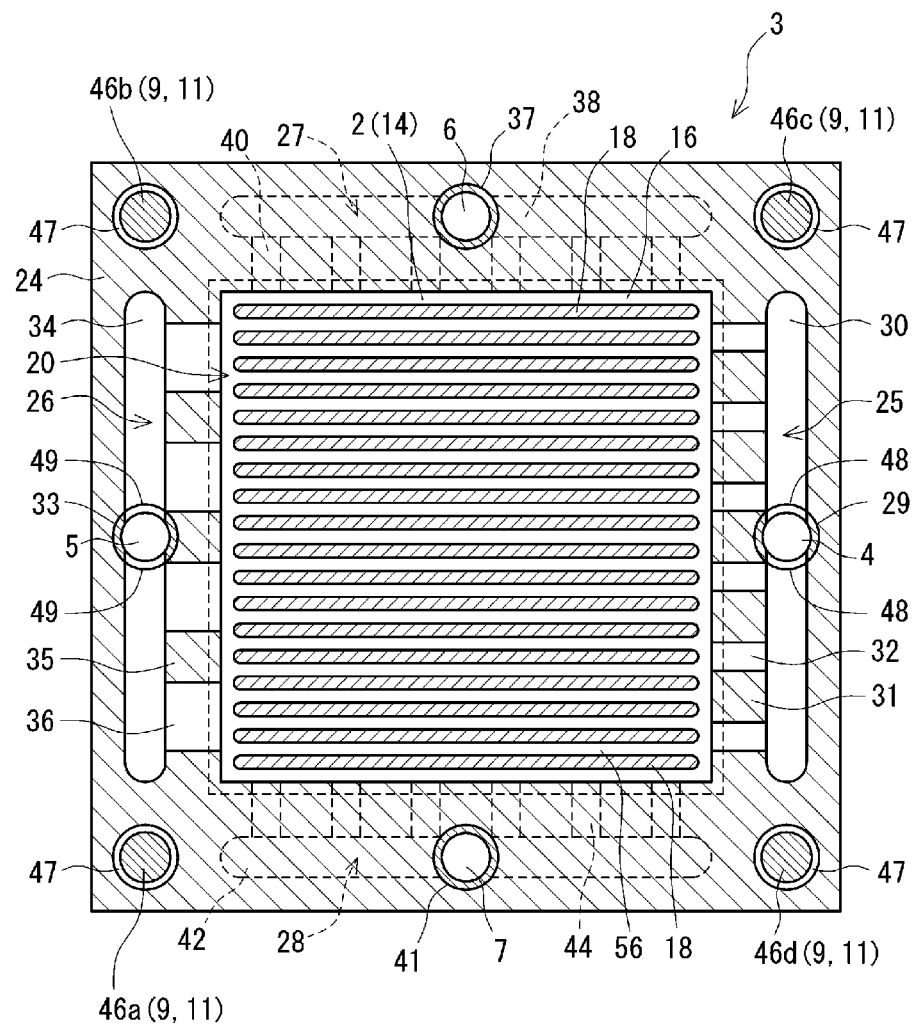
FIG. 7 is a cross-sectional view of the fuel cell of FIG. 5 taken along line A-A.

The aforementioned air supply path 4 is attached to the fuel cell stack 8 so as to vertically penetrate the through holes (not illustrated) of the end plates 45a and 45b and the air supply through holes 29 of the cell group. When the ends of the tubular path are closed, and, as shown in FIG. 7, a transverse hole 48 is provided on each air supply communicating chamber 30, air is supplied to the air supply communicating chamber 30 via the transverse hole 48.

Figure 8:
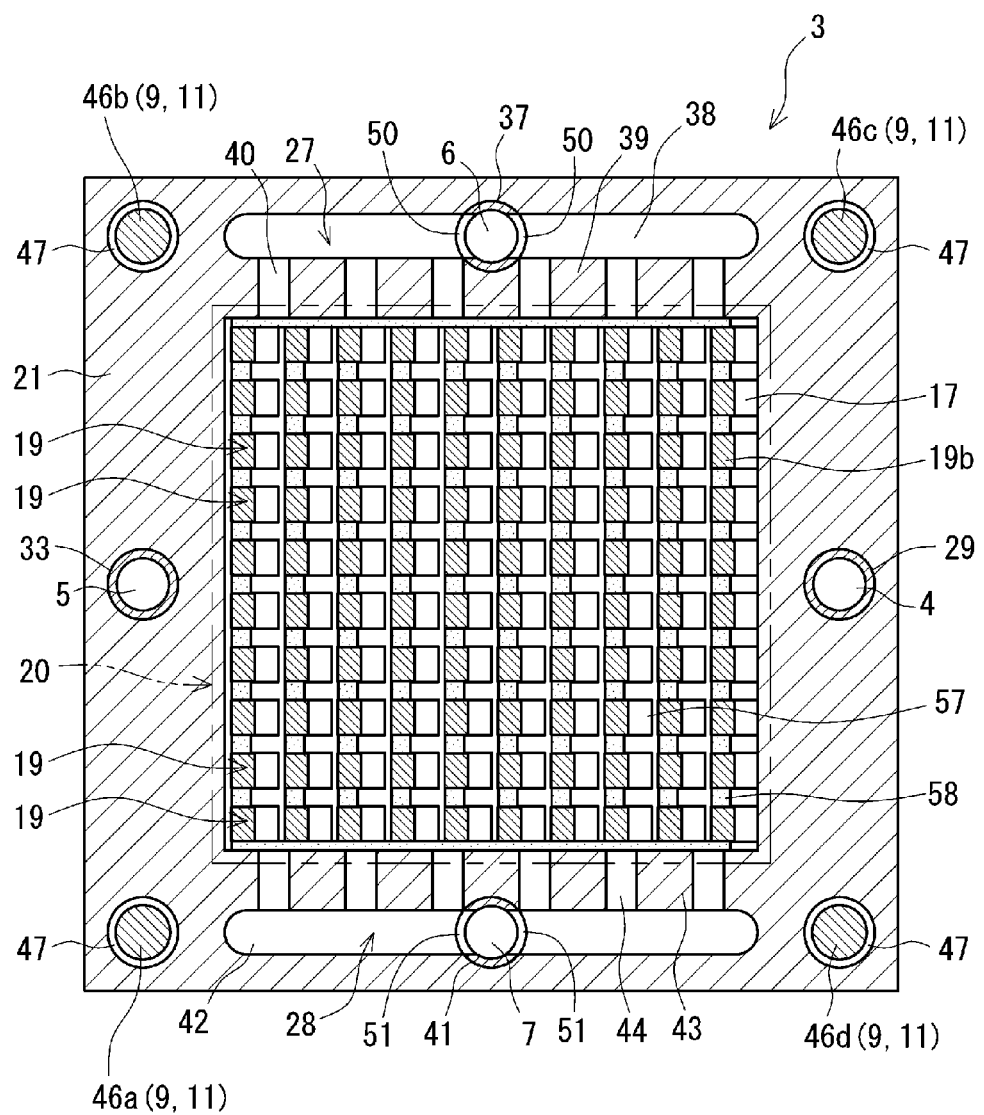
FIG. 8 is a cross-sectional view of the fuel cell of FIG. 5 taken along line B-B.

Similarly, in the air discharge path 5, air is discharged through a transverse hole 49 provided on each air discharge communicating chamber 34 to the outside. As shown in FIG. 8, in the fuel supply path 6, a fuel gas is supplied through a transverse hole 50 provided on each fuel supply communicating chamber 38. In the fuel discharge path 7, the fuel gas is discharged through a transverse hole 51 provided on each fuel discharge communicating chamber 42 to the outside.

[Container]

The container 10 for accommodating the fuel cell stack 8 has a heat-resistant and sealed structure. As shown in FIG. 1, the container 10 is formed by bonding two halved parts 53a and 53b having, on openings thereof, flanges 52a and 52b such that the flanges face each other. The bolts of the aforementioned clamping members 46a to 46d protrude from the top of the container 10 to the outside. The fuel cell stack 8 is fixed in the container 10 by screwing nuts 54 onto the protruding portions of the clamping members 46a to 46d. Also, the air supply path 4, the air discharge path 5, the fuel supply path 6, and the fuel discharge path 7 protrude from the top of the container 10, and the protruding portions thereof are connected to an air supply source, a fuel gas supply source, etc.

[Output Member]

The output member 11 for outputting electric power generated by the fuel cell stack 8 corresponds to the clamping members 46a to 46d located at the corners of the fuel cell stack 8 and the end plates 45a and 45b. A pair of diagonally facing clamping members 46a and 46c are electrically connected to the upper end plate 45a serving as a positive electrode, and the other pair of clamping members 46b and 46d are electrically connected to the lower end plate 45b serving as a negative electrode. Needless to say, the clamping members 46a and 46c connected to the positive electrode and the clamping members 46b and 46d connected to the negative electrode are respectively insulated from the end plate 45b and 45a by means of insulating washers 55 (see FIG. 1), and are also insulated from the fuel cell stack 8 by, for example, providing a gap between each corner through hole 47 and each clamping member. Thus, the clamping members 46a and 46c of the fixing member 9 also serve as positive electrode output terminals connected to the upper end plate 45a, and the clamping members 46b and 46d also serve as negative electrode output terminals connected to the lower end plate 45b.

[Power Generation]

When air is supplied to the air supply path 4 of the fuel battery 1, the air flows therethrough from the right side to the left side as shown in FIG. 7. Specifically, the air is supplied to the air chamber 16 through the air supply unit 25, which includes the right-side air supply path 4, the air supply communicating chamber 30, and the air supply communicating portion 32. The air passes through gas paths 56 between the current collection members 18 of the air chamber 16, and then the air is discharged to the outside through the air discharge unit 26, which includes the air discharge communicating portion 36, the air discharge communicating chamber 34, and the air discharge path 5.

In parallel therewith, when a fuel gas (e.g., hydrogen) is supplied to the fuel supply path 6 of the fuel battery 1, the fuel gas flows therethrough from the upper side to the lower side as shown in FIG. 8. Specifically, the fuel gas is supplied to the fuel chamber 17 through the fuel supply unit 27, which includes the upper-side fuel supply path 6, the fuel supply communicating chamber 38, and the fuel supply communicating portion 40. The fuel gas diffuses through gas paths 57 between the current collection members 19, 19 of the fuel chamber 17 (strictly, between the cell main body abutment portions 19b, 19b; see a non-shaded portion of the fuel chamber 17 in FIG. 8), and then the fuel gas is discharged to the outside through the fuel discharge unit 28, which includes the fuel discharge communicating portion 44, the fuel discharge communicating chamber 42, and the fuel discharge path 7.

When the current collection members 19 are formed of porous metal, metal mesh, wire, or punching metal as described above, since the surfaces of the gas paths 57 become uneven, the diffusibility of the fuel gas is improved.

When the temperature in the container 10 is elevated to 700° C. to 1,000° C. under the aforementioned supply and discharge of air and the fuel gas, reaction between air and the fuel gas occurs via the cathode 14, the electrolyte 2, and the anode 15. Therefore, DC electric energy is generated between the cathode 14 serving as a positive electrode and the anode 15 serving as a negative electrode. Since the principle of generation of electric energy in the fuel cell 3 is well known, description thereof is omitted.

As described above, the cathode 14 is electrically connected to the upper interconnector 12 via the current collection member 18, whereas the anode 15 is electrically connected to the lower interconnector 13 via the current collection member 19. Meanwhile, the fuel cell stack 8 is formed by stacking and connecting a plurality of the fuel cells 3 in series. Therefore, the upper end plate 45a serves as a positive electrode, and the lower end plate 45b serves as a negative electrode. The electric energy generated by the fuel cell stack is output to the outside via the clamping members 46a to 46d, which also serve as output terminals.

As described above, the fuel battery is subjected to repeated temperature cycles; i.e., elevation of temperature during power generation, and lowering of temperature during stop of power generation. Therefore, all the members forming the fuel chamber 17 or the air chamber 16 and the aforementioned clamping members 46a to 46d are subjected to repeated thermal expansion and contraction, and accordingly the size of the fuel chamber 17 or the air chamber 16 is increased and decreased repeatedly.

In some cases, fuel pressure or air pressure may vary, and the size of the fuel chamber 17 or the air chamber 16 may increase or decrease due to deformation of the cell main body 20 caused by a change in fuel or air pressure.

In the case of Embodiment 1, even when a change in size (increase in size) occurs in the fuel chamber 17 or the air chamber 16, since the current collection member 19 toward the side of the fuel chamber 17 presses the cell main body 20 by means of the elastic force of the connection portion 19c, the elastic force (in a lamination direction) of the spacer 58, and thermal expansion of the spacer 58 in the lamination direction, electric connection is reliably maintained. Since pressing of the cell main body 20 by the current collection member 19 also affects the air chamber 16, electrical connection in the air chamber 16 is also reliably maintained.

Meanwhile, even when a change in size (decrease in size) occurs in the fuel chamber 17 or the air chamber 16, stress applied to the cell main body 20 is relaxed by means of the elastic force of the connection portion 19c of the current collection member 19 toward the side of the fuel chamber 17 and contraction of the spacer 58.

Since the connection portion 19c of the current collection member 19 exhibits a sufficient elastic force, and the spacer 58 also exhibits an elastic force, even when the elastic force of the metallic current collection member 19 is affected by creep deformation under temperature elevation (high temperature) (e.g., temperature elevation during power generation), contact points can be maintained in a favorable state.

In view of the foregoing, the current collection member 19 was formed from Ni, and the spacer 58 was formed from mica, to thereby produce an experimental fuel battery. Electric power was generated by the thus-produced fuel battery, and there was studied the relationship between the elasticity of the current collection member 19 or the spacer 58 and maintenance of contact points.

As a result, it was found that, in the case where the current collection member 19 exhibited a sufficiently high elastic force as compared with the spacer 58 formed of mica, even when a change in size (decrease in size) occurred in the fuel chamber 17 or the air chamber 16 during assembly of the fuel cell stack or lowering temperature (after power generation, etc.), contact points were maintained in a favorable state.

Meanwhile, even when the elastic force of the current collection member 19 was reduced due to creep deformation caused by heat during temperature elevation (at initiation of power generation, etc.), this reduction in elastic force was compensated by thermal expansion of the spacer 58, and a contact force sufficient for achieving electrical connection was maintained. Therefore, even when a change in size (increase in size) occurred in the fuel chamber 17 or the air chamber 16, contact points were maintained in a favorable state.

When the current collection member 19 toward the side of the anode 15 is formed of Ni or an Ni alloy, the cell main body abutment portion 19b is diffusion-bonded to and integrated with Ni contained in the anode 15 at high temperature during power generation. Therefore, electrical connection is more reliably maintained by means of the current collection member 19.

Preferably, a bonding layer is formed on the anode 15 by applying an NiO paste thereto. In such a case, since NiO is converted to Ni through application of electricity in the presence of $H_2$, the bondability between the current collection member 19 and the anode 15 is further improved. The bonding layer may be formed by applying a Pt paste to the anode 15.

In Embodiment 1, the flat plate 19p (i.e., an aggregate of the connector abutment portions 19a) is bonded to the lower interconnector 13 through welding. However, when the interconnector 13 and the flat plate 19p are formed of a combination of materials (e.g., Crofer22H and Ni) which can be diffusion-bonded to each other at high temperature during power generation, or when the aforementioned bonding layer is formed on the inner surface of the lower interconnector 13, the interconnector 13 can be bonded to and integrated with the current collection member 19 at high temperature during power generation.

Embodiment 2

Figure 12:
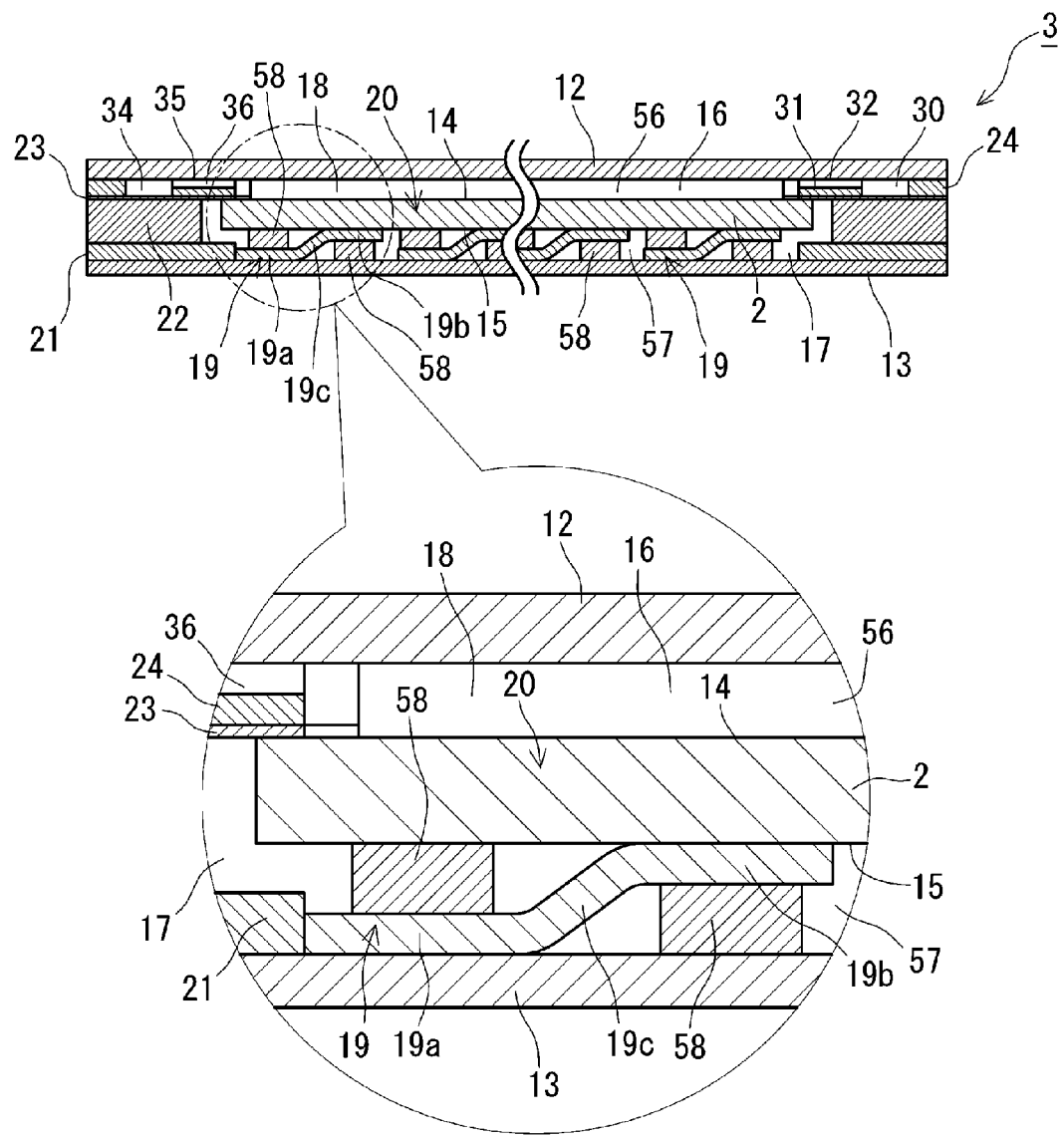
FIG. 12 is an intermediate-omitted, vertical cross-sectional view of a fuel cell according to another embodiment (Embodiment 2).
Figure 13:
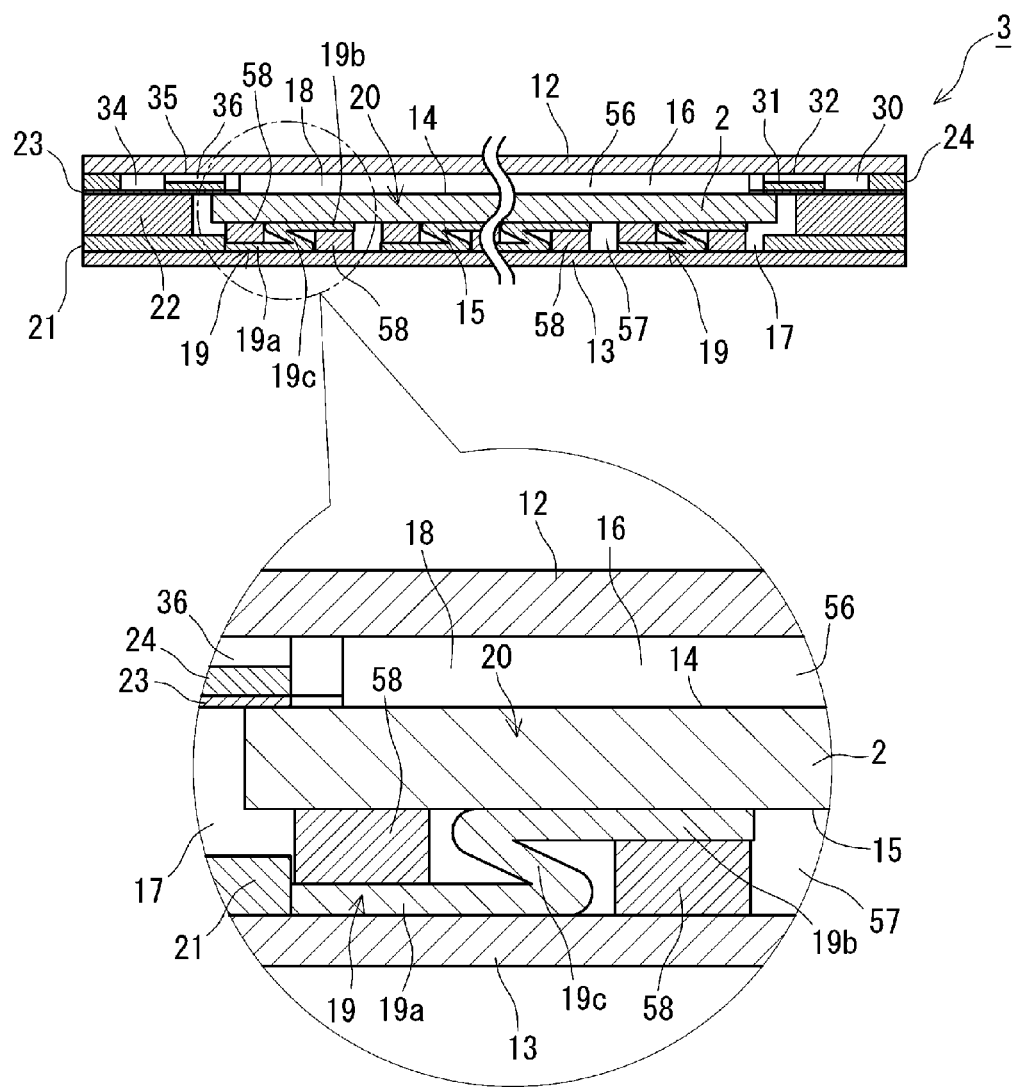
FIG. 13 is an intermediate-omitted, vertical cross-sectional view of a fuel cell according to yet another embodiment (Embodiment 2).
Figure 14:
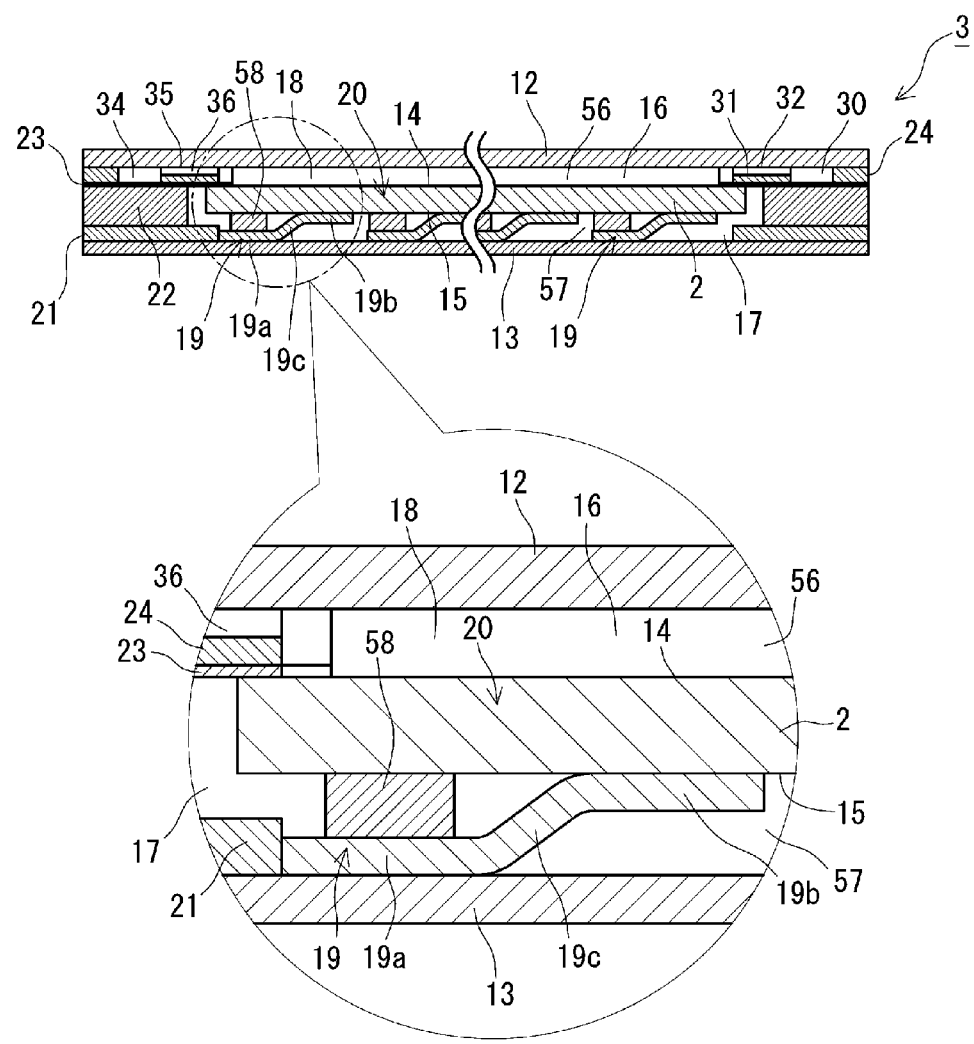
FIG. 14 is an intermediate-omitted, vertical cross-sectional view of a fuel cell according to yet another embodiment (Embodiment 2).
Figure 15:
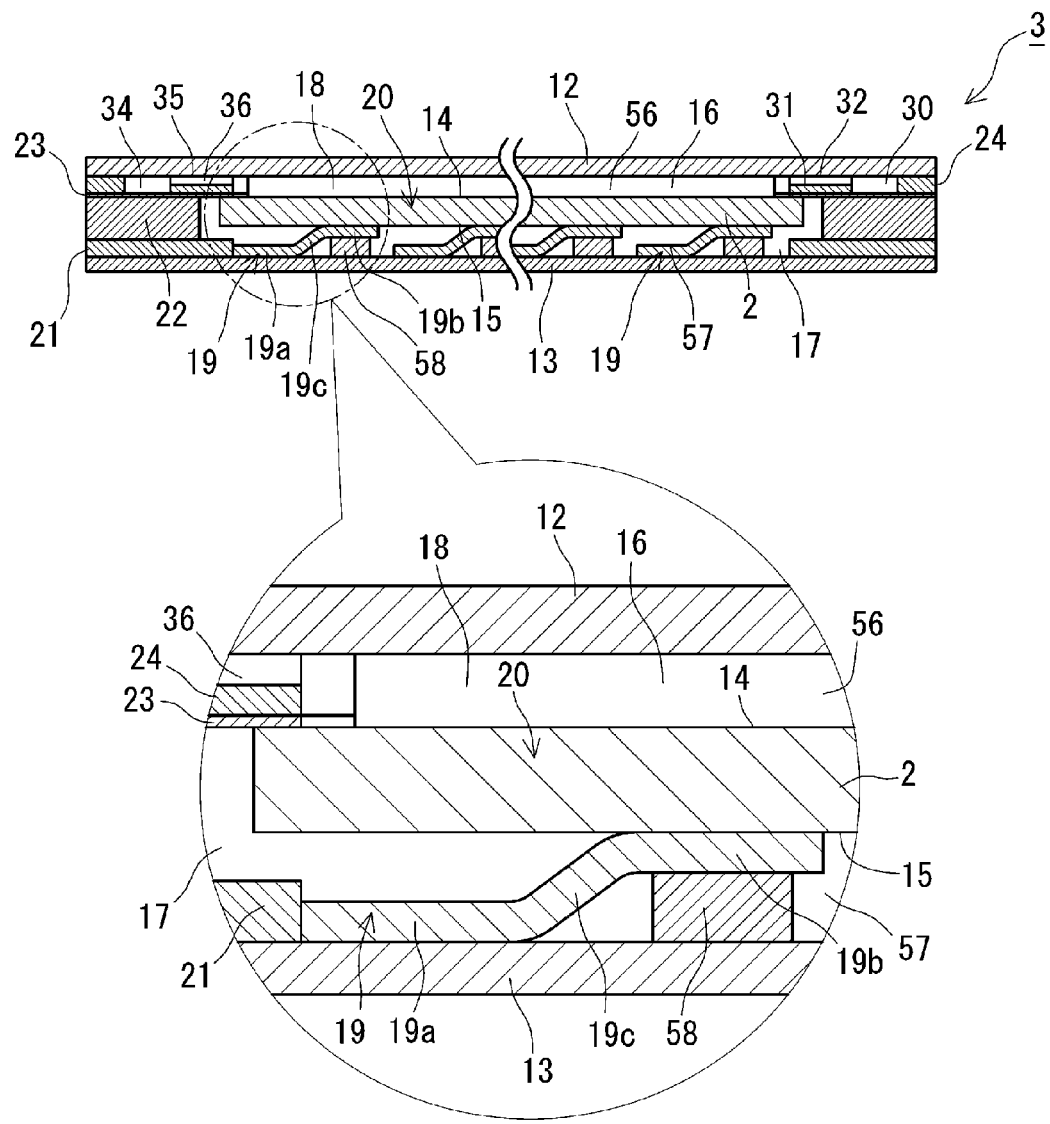
FIG. 15 is an intermediate-omitted, vertical cross-sectional view of a fuel cell according to yet another embodiment (Embodiment 2).
Figure 16:
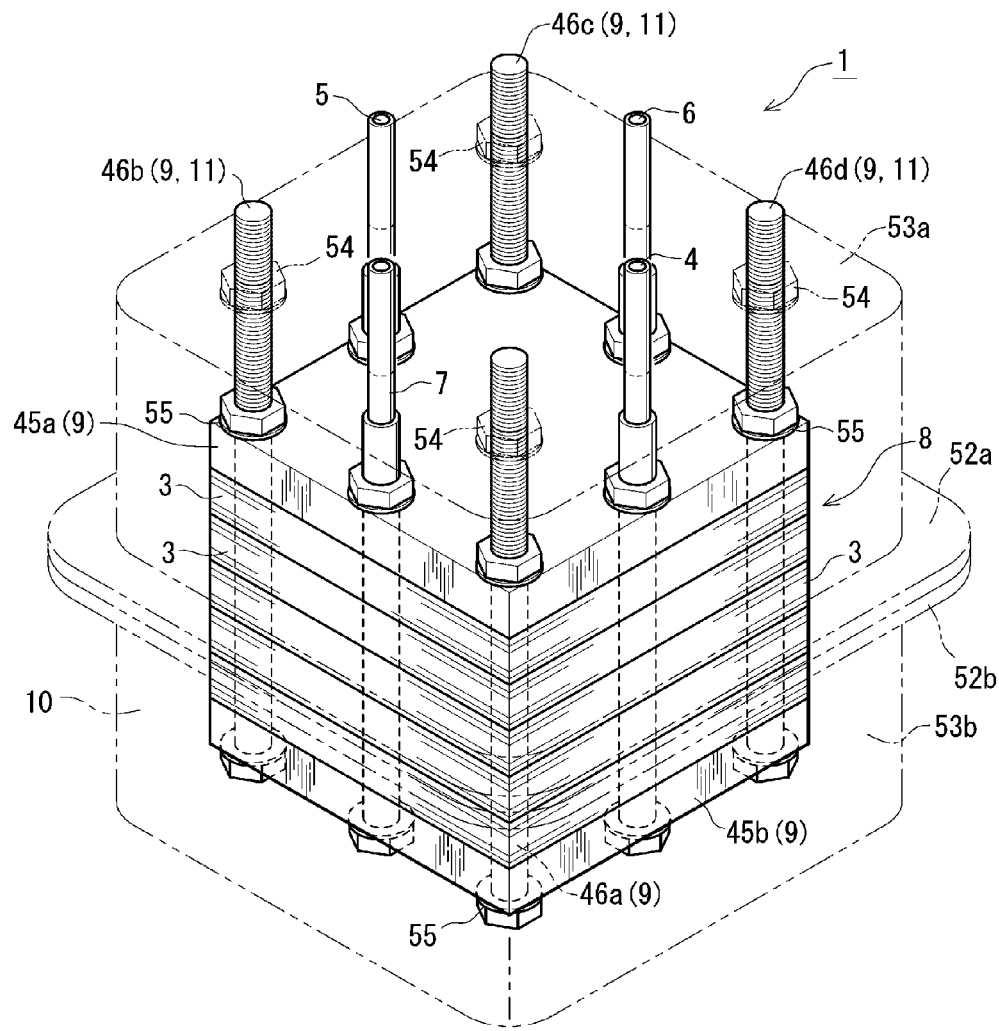
FIG. 16 is a perspective view of a fuel battery according to Embodiment 3.
Figure 17:
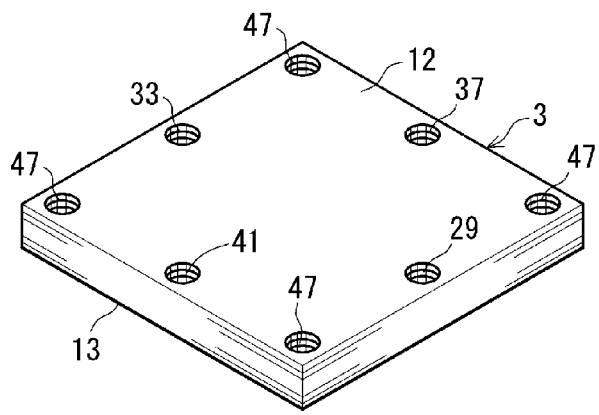
FIG. 17 is a perspective view of a fuel cell according to Embodiment 3.

FIGS. 12 to 15 are intermediate-omitted, vertical cross-sectional views of a fuel cell 3 according to Embodiment 2. In Embodiment 1, the connection portion 19c of the current collection member 19 is bent so as to have a U-shaped cross section; the cell main body abutment portion 19b is provided above the connector abutment portion 19a; and the spacer 58 is provided between the connector abutment portion 19a and the cell main body abutment portion 19b. In contrast, in Embodiment 2, as shown in FIG. 12, the connection portion 19c is provided so as to extend obliquely such that the positions (in a vertical direction) of the connector abutment portion 19a and the cell main body abutment portion 19b completely differ from each other. Alternatively, as shown in FIG. 13, the current collection member 19 is provided so as to have a generally Z-shaped cross section such that the connector abutment portion 19a and the cell main body abutment portion 19b partially overlap with each other in a vertical direction and also differ in vertical position from each other. The spacers 58 are provided so as to separate the connector abutment portion 19a from the cell main body 20 and to separate the cell main body abutment portion 19b from the interconnector 13. Alternatively, as shown in FIG. 14, the spacer 58 may be provided so as to separate the connector abutment portion 19a from the cell main body 20, or, as shown in FIG. 15, the spacer 58 may be provided so as to separate the cell main body abutment portion 19b from the interconnector 13.

The fuel battery of Embodiment 2 has the same configuration as that of Embodiment 1, except for the above-described differences. Therefore, detailed description of the fuel battery of Embodiment 2 is omitted.

Embodiment 3

A fuel battery 1 according to Embodiment 3 shown in FIGS. 16 to 26 is an SOFC including an electrolyte 2 formed of, for example, a $ZrO_2$ ceramic material. The fuel battery 1 generally includes a fuel cell 3 serving as a minimum unit for power generation; an air supply path 4 for supplying air to the fuel cell 3; an air discharge path 5 for discharging air to the outside; a fuel supply path 6 for supplying a fuel gas to the fuel cell 3; a fuel discharge path 7 for discharging the fuel gas to the outside; a fixing member 9 for fixing a cell group prepared through stacking of a plurality of the fuel cells 3, to thereby produce a fuel cell stack 8; a container 10 for accommodating the fuel cell stack 8; and an output member 11 for outputting electric power generated by the fuel cell stack 8.

There is omitted detailed description of the components and members which are common between Embodiment 3 and Embodiment 1, as well as detailed description of power generation, etc. The fuel battery of Embodiment 3 will be described by focusing on portions different from those of Embodiment 1. In Embodiment 3, the members which are common with those of Embodiment 1 are denoted by the same reference numerals (exclusive of current collection members 180 and 190, a connector abutment portion 190a, a cell main body abutment portion 190b, a connection portion 190c, a pre-cut line 190d, a flat plate 190p, and a spacer 580).

[Fuel Cell]

Figure 18:
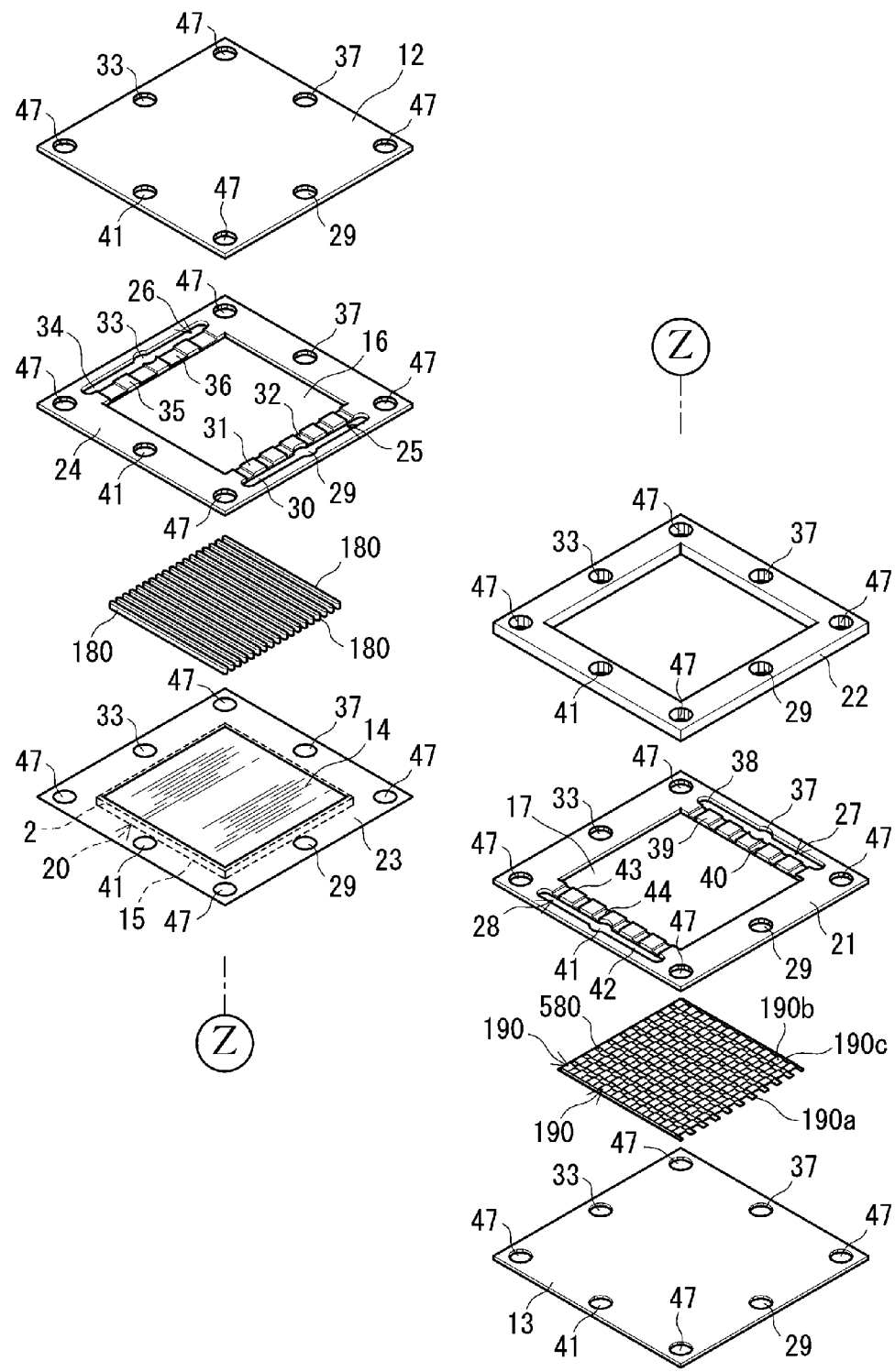
FIG. 18 is an exploded perspective view of the fuel cell according to Embodiment 3.
Figure 19:
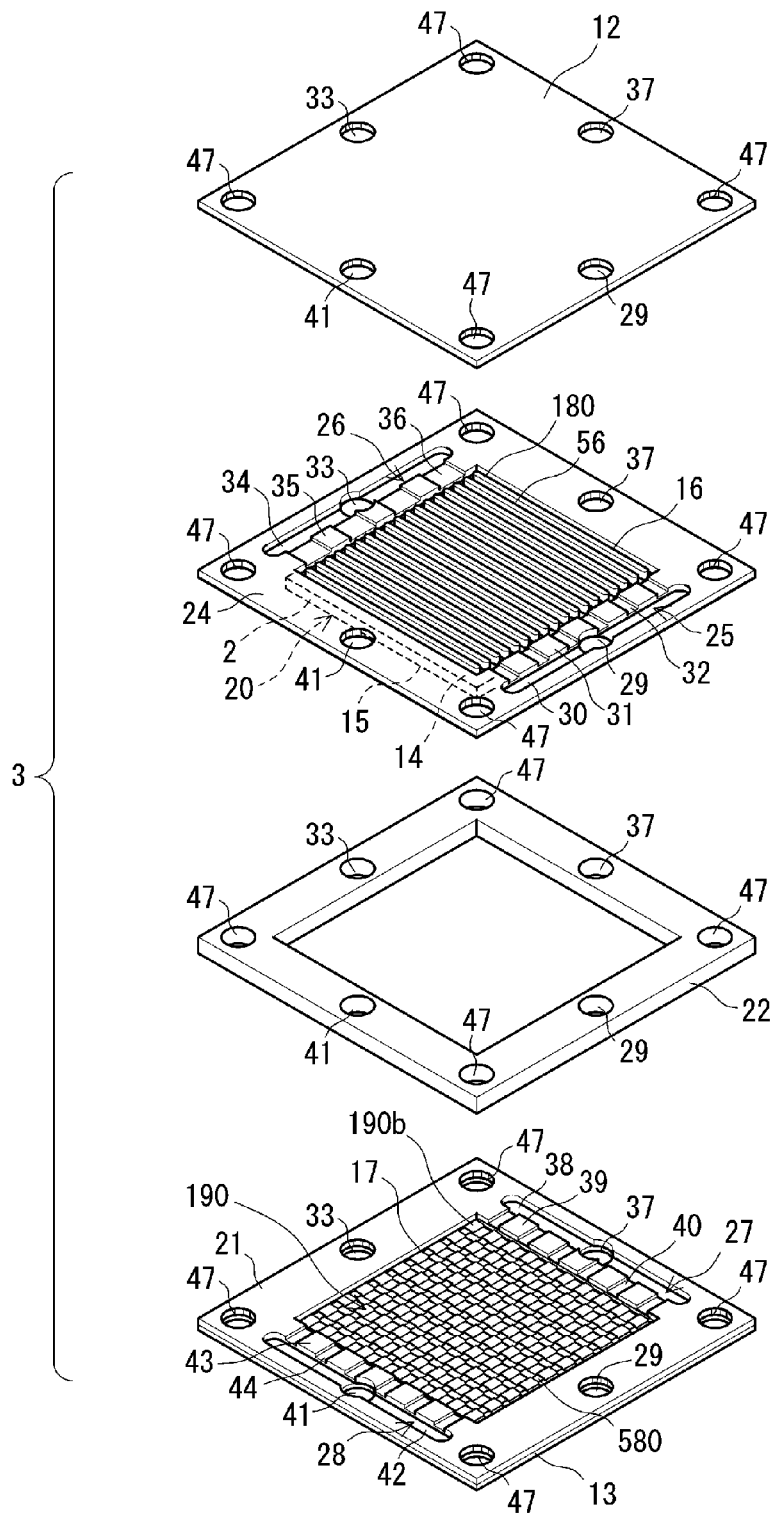
FIG. 19 is an exploded perspective view of the fuel cell according to Embodiment 3, in which some parts are not shown in an exploded manner.

The fuel cell 3 has a square shape in plan view. As shown in FIG. 18, the fuel cell 3 includes an upper interconnector 12 which is in square plate form and is formed of, for example, electrically conductive ferrite stainless steel; a lower interconnector 13 which is in square plate form and is formed of, for example, electrically conductive ferrite stainless steel; a cell main body 20 which is located generally at the middle between the upper and lower interconnectors 12 and 13, which has an electrode (cathode) 14 formed on a surface of an electrolyte 2 facing the inner surface (lower surface) of the upper interconnector 12, and which has another electrode (anode) 15 formed on a surface of the electrolyte 2 facing the inner surface (upper surface) of the lower interconnector 13; an air chamber 16 formed between the upper interconnector 12 and the cathode 14; a fuel chamber 17 formed between the lower interconnector 13 and the anode 15; a current collection member 180 (on the side toward the cathode 14) which is provided inside of the air chamber 16 and which electrically connects the cathode 14 and the upper interconnector 12; and a current collection member 190 (on the side toward the anode 15) which is provided inside of the fuel chamber 17 and which electrically connects the anode 15 and the lower interconnector 13. The square fuel cell 3 has, at the corners thereof, corner through holes 47, 47 through which the below-described clamping members 46a to 46d of the aforementioned fixing member 9 penetrate.

[Fuel-Chamber-Side Current Collection Member]

The current collection member 190 toward the side of the fuel chamber 17 is formed of, for example, Ni which has been subjected to thermal treatment (annealing) under vacuum at 1,000° C. for one hour (HV hardness: 200 or less). The current collection member 190 has a connector abutment portion 190a which abuts the lower interconnector 13, a cell main body abutment portion 190b which abuts the anode 15 of the cell main body 20, and a U-shaped connection portion 190c which connects the connector abutment portion 190a and the cell main body abutment portion 190b, the portions 190a to 190c being continuously formed. Since the current collection member 190 of this embodiment is formed of a foil material having a thickness of about 30 μm, the connection portion 190c is bendable and stretchable in a direction crossing with the surface thereof, and exhibits virtually no resistive force against bending or stretching.

The current collection member 190 toward the side of the fuel chamber 17 may be formed of, in place of the aforementioned foil material, for example, porous Ni, Ni mesh, Ni wire, or Ni punching metal. The current collection member 190 toward the side of the fuel chamber 17 may be formed of, in place of Ni, an oxidation-resistant metal such as an Ni alloy or stainless steel.

About several tens to one hundred current collection members 190 are provided in the fuel chamber 17 (needless to say, the number of the current collection members may vary in association with the size of the fuel chamber). The current collection members 190 may be individually arranged on the interconnector 13 and subjected to welding (e.g., laser welding or resistance welding). However, preferably, as shown in FIG. 25(b), the aforementioned foil material is processed into a square flat plate 190p so as to match the fuel chamber 17, and pre-cut lines 190d, each corresponding to the cell main body abutment portion 190b and the connection portion 190c, are provided on the flat plate 190p, so that, as shown in the enlarged view of FIG. 24, when the connection portion 190c is bent so as to have a U-shaped cross section, the cell main body abutment portion 190*b* is provided above and at a distance t from the connector abutment portion 190*a* (see the enlarged view of FIG. 20). Therefore, the flat plate 190*p* having holes corresponding to the bent cell main body abutment portions 190*b* corresponds to an aggregate of the connector abutment portions 190*a*. In this embodiment, the connector abutment portions 190*a* of the flat plate 190*p* are bonded to the lower interconnector 13 through laser welding or resistance welding.

Figure 26:
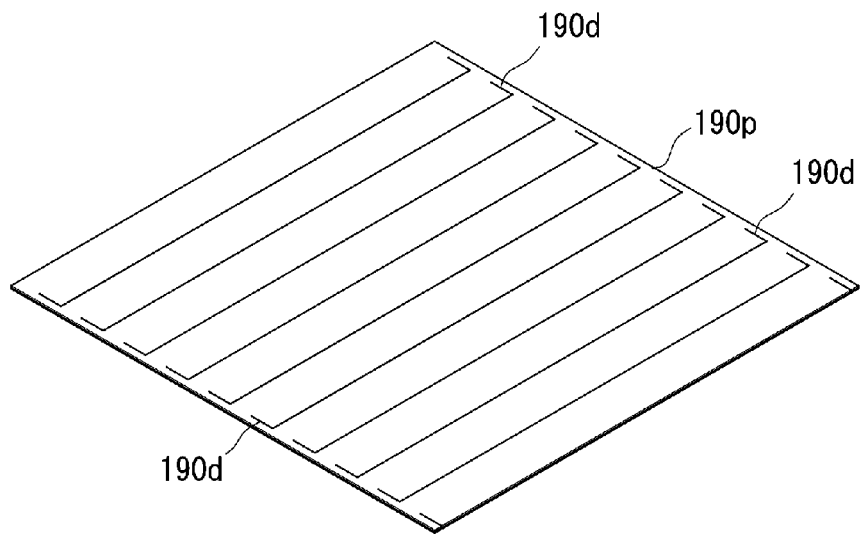
FIG. 26 is a perspective view of a current collection member, which is a modification of the current collection member of FIG. 25(b).

As shown in FIG. 26, the pre-cut lines 190*d* of the current collection members 190 may be formed such that the cell main body abutment portions 190*b* and the connection portions 190*c* are integrated into one row. In such a case, the cell main body abutment portions 190*b* and the connection portions 190*c* can be processed efficiently.

[Spacer]

Figure 20:
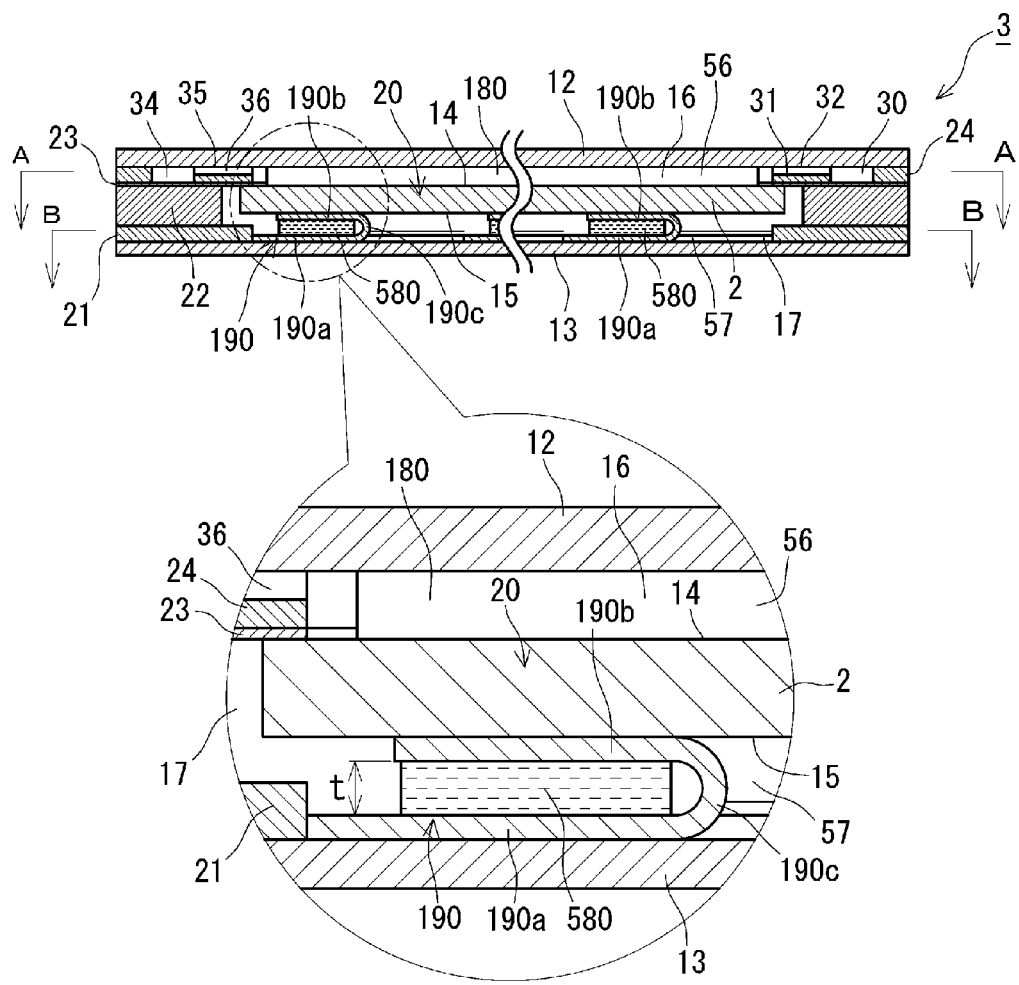
FIG. 20 is an intermediate-omitted, vertical cross-sectional view of the fuel cell according to Embodiment 3.
Figure 21:
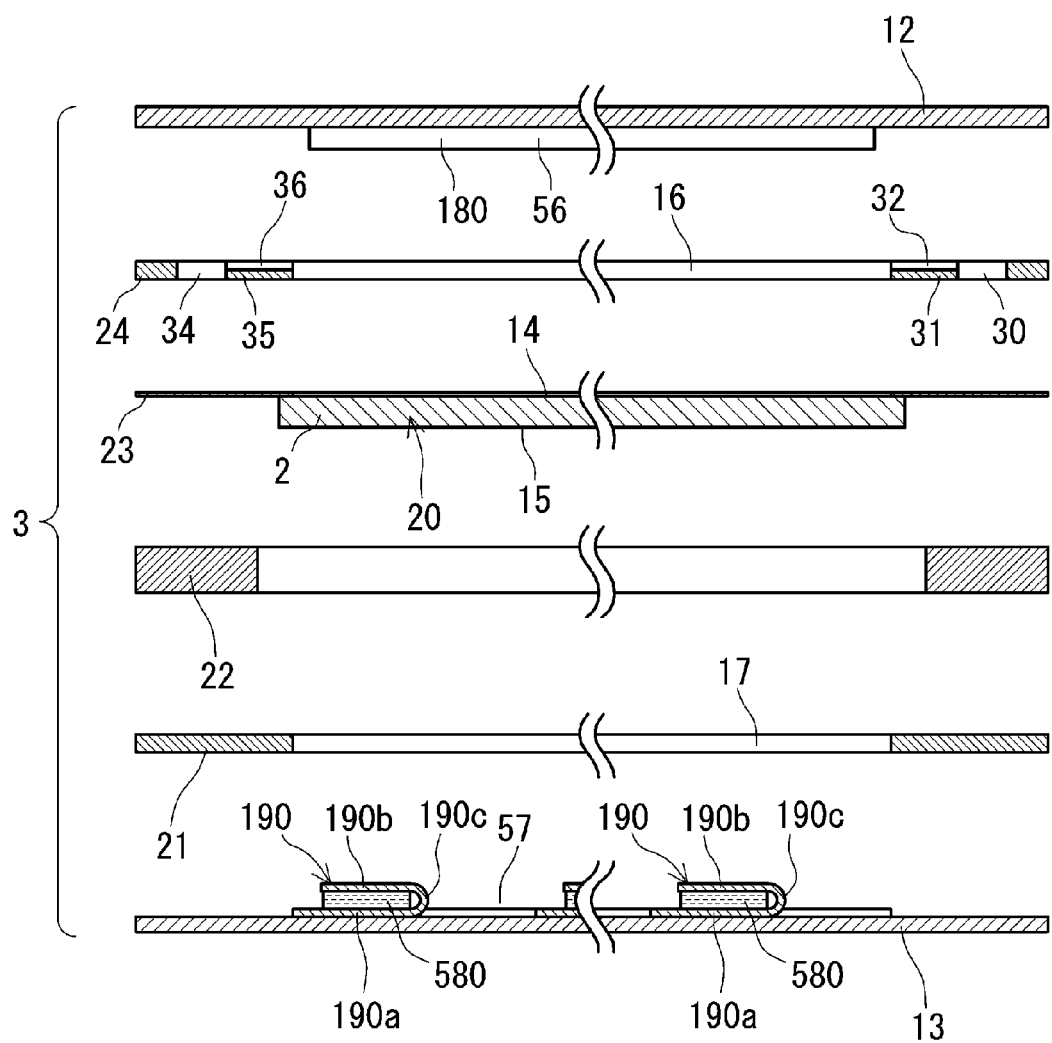
FIG. 21 is an exploded vertical cross-sectional view of the fuel cell of FIG. 20.
Figure 22:
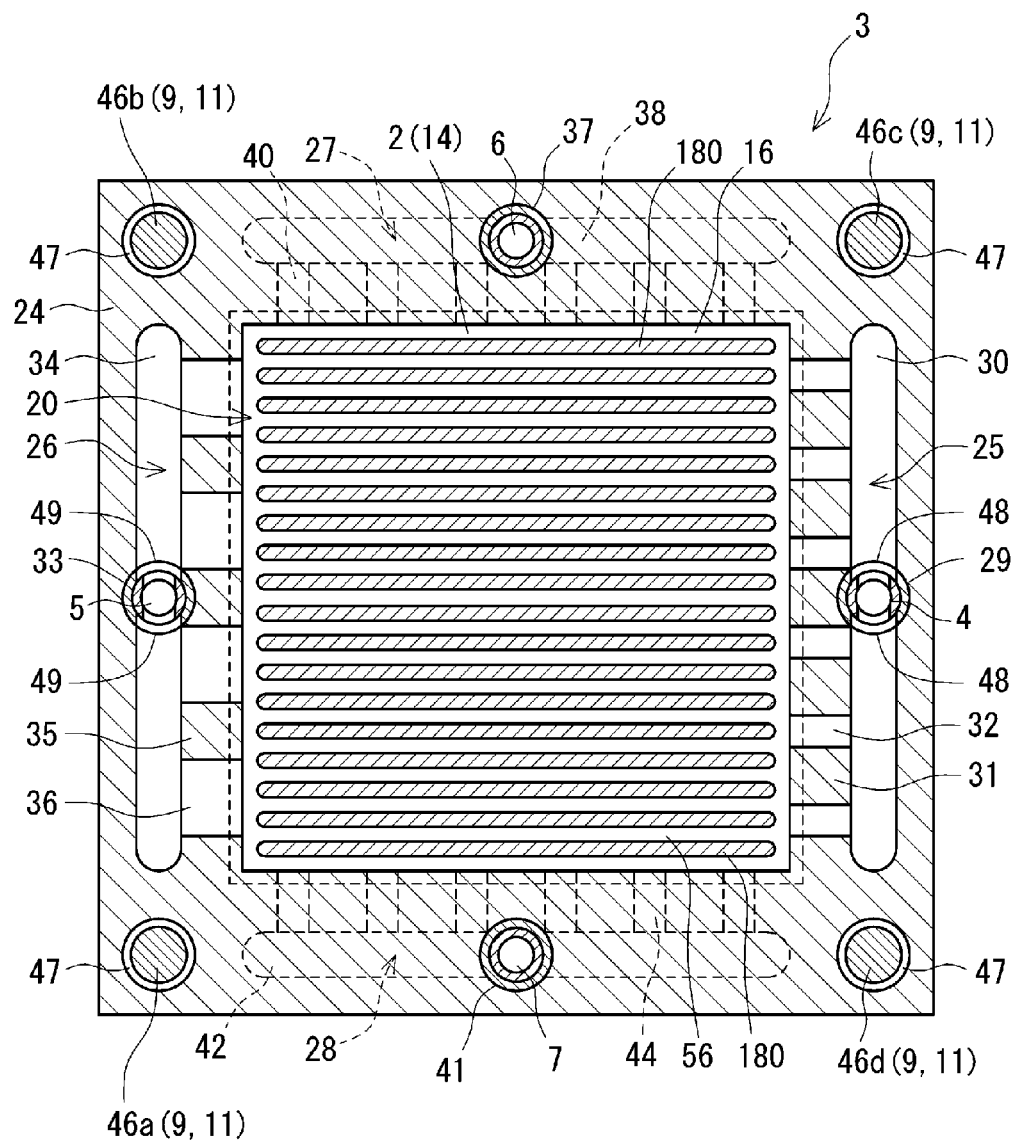
FIG. 22 is a cross-sectional view of the fuel cell of FIG. 20 taken along line A-A.
Figure 23:
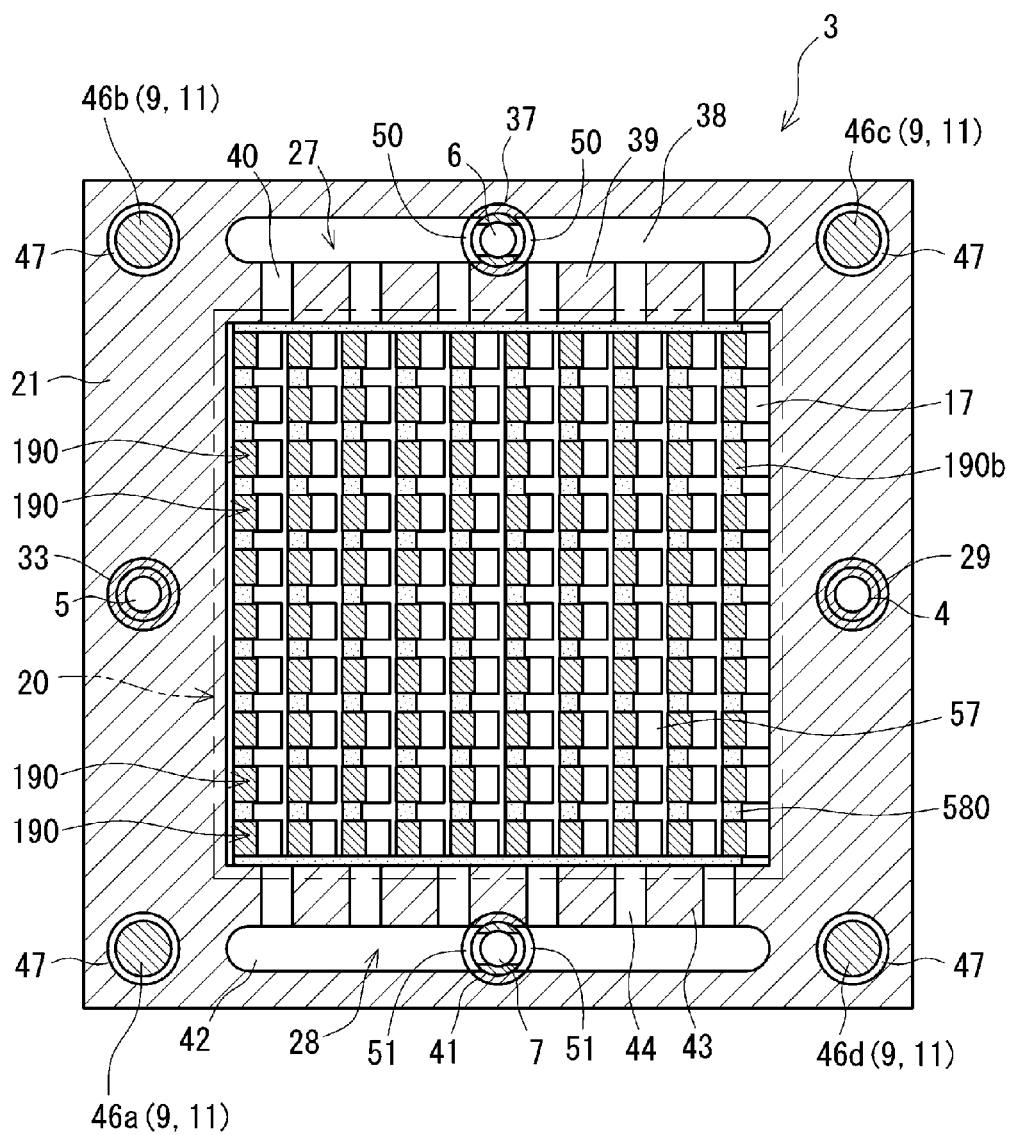
FIG. 23 is a cross-sectional view of the fuel cell of FIG. 20 taken along line B-B.

As shown in FIG. 20, a spacer 580 is provided in the current collection member 190. In the fuel chamber 17 between the cell main body 20 and the lower interconnector 13, the spacer 580, which exhibits elastic force in a thickness direction, is provided between the connector abutment portion 190*a* and the cell main body abutment portion 190*b* so as to separate them from each other. The thickness and material of the spacer 580 are determined so that the thickness thereof becomes greater than the aforementioned distance t—which increases through thermal expansion—when the spacer 580 is thermally expanded, in a thickness direction, at least at the operating temperature region of the fuel cell (i.e., 700° C. to 1,000° C.), so as to press the cell main body abutment portion 190*b* and the connector abutment portion 190*a* in the respective abutment directions; i.e., to press the cell main body abutment portion 190*b* toward the cell main body 20, and to press the connector abutment portion 190*a* toward the interconnector 13.

No particular limitation is imposed on the thickness of the spacer 580, so long as it is larger than the distance t (see FIG. 20) between the cell main body abutment portion 190*b* and the connector abutment portion 190*a* at the operating temperature region of the fuel cell. Preferably, the thickness of the spacer 580 is adjusted to be at least almost equal to or slightly larger than the distance t between the cell main body abutment portion 190*b* and the connector abutment portion 190*a* at ambient temperature during non-operation of the fuel cell. In such a case, reliable electrical contact is maintained between the connector abutment portion 190*a* and the interconnector 13 and between the cell main body abutment portion 190*b* and the cell main body 20 by means of the spacer 580 until the temperature of the fuel cell reaches the operating temperature region after initiation of power generation.

The spacer 580 is formed of a material which exhibits, in a thickness direction, elasticity higher than that of the current collection member 190. Therefore, with respect to a change in size of the fuel chamber 17 resulting from a temperature cycle or a change in fuel or air pressure, the extent of an increase/decrease in thickness of the spacer 580 is larger, as compared with the case of the current collection member 190, which exhibits relatively low elasticity. Specifically, the spacer 580 contracts in a thickness direction with respect to a decrease in size of the fuel chamber 17, and exhibits a buffering effect, to thereby prevent breakage of the cell main body 20. Meanwhile, the spacer 580 exhibits resilience in a thickness direction with respect to an increase in size of the fuel chamber 17, to thereby stabilize electrical contact points.

Specifically, the elastic deformation of the spacer 580 can be compared with that of the current collection member 190 by measuring the elastic deformation through the following compression test.

Firstly, samples of the spacer 580 and the current collection member 190 for the compression test are prepared. The size of each sample is adjusted to 6.5 mm×4 mm so as to match the contact area between the actual spacer 580 and the current collection member. The thickness of the spacer sample is adjusted to 0.4 mm (i.e., actual spacer thickness), and the thickness of the current collection member sample is adjusted to 30 μm (i.e., actual current collection member thickness). Preferably, the thicknesses of the spacer 580 and the current collection member 190 are adjusted so as to match the shapes of those as actually used. When the spacer 580 and the current collection member 190 have the same size, the size may be any value.

Subsequently, each sample is compressed at 10 kg by means of a compression tester, and the amount of a change in thickness (mm) is measured. Then, maximum displacement amount is determined.

Figure 27:
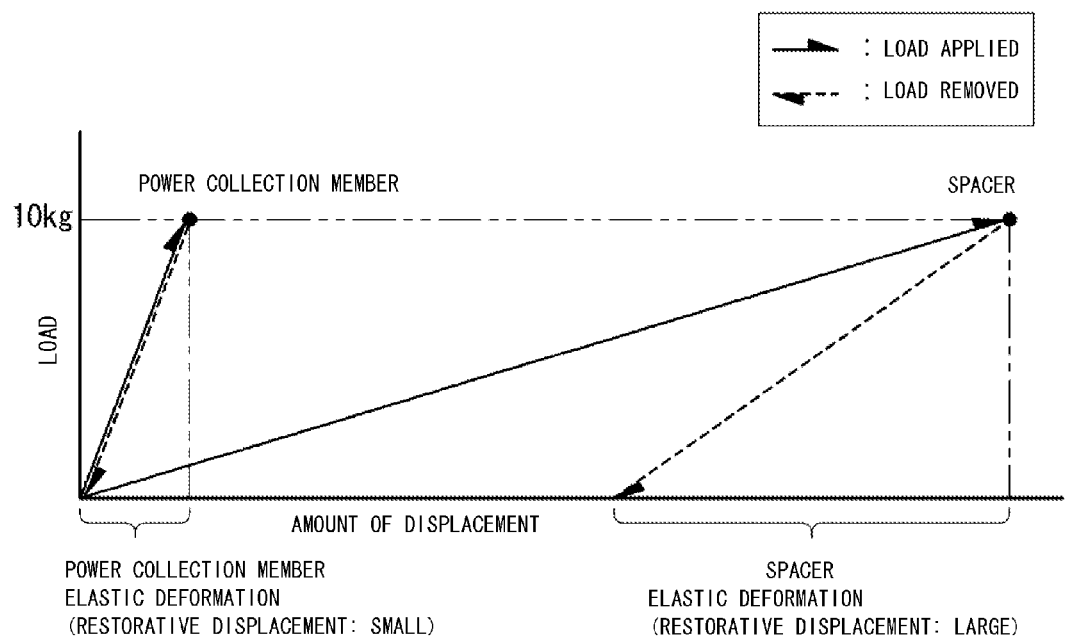
FIG. 27 is a graph showing the relationship between load and displacement regarding a current collection member and a spacer.

Then, the compression (10 kg) is released, and the amount of restorative displacement from the maximum displacement is measured (see the graph of FIG. 27).

In the case of, for example, the current collection member 190 having a thickness as small as 30 μm, the amount of displacement may be very small, and thus may fail to be measured when a compression tester employed has low accuracy. In such a case, a plurality of the thin current collection members 190 are stacked (e.g., 10 members are stacked), and the thus-stacked members are subjected to the aforementioned compression test. The maximum displacement amount or the restorative displacement amount can be determined by dividing the thus-measured amount of displacement by the number of the stacked members.

The greater the restorative displacement amount of a sample having a shape as actually used, the greater the elastic deformation thereof, whereas the smaller the restorative displacement amount of the sample, the smaller the elastic deformation thereof.

When the spacer 580 and the current collection member 190 of the present invention are subjected to the aforementioned test, as shown in the graph of FIG. 27, the amount of displacement of the spacer 580 is considerably larger than that of the current collection member 190.

The spacer 580 is formed of a material which is not sintered to the current collection member 190 at the operating temperature region of the fuel cell. Therefore, the cell main body abutment portion 190*b* and the connector abutment portion 190*a* are not sintered together by coming into direct contact with each other, and the cell main body abutment portion 190*b* and the connector abutment portion 190*a* are not sintered to each other via the spacer 580.

The material of the spacer 580 satisfying the aforementioned conditions may be any one species or a combination of a plurality of species selected from among mica, alumina felt, vermiculite, carbon fiber, silicon carbide fiber, and silica. When the spacer 580 is formed of a laminate structure of thin plates (e.g., mica), appropriate elasticity is imparted with respect to a load in a lamination direction. The spacer 580 formed of such a material exhibits, in a thickness direction (lamination direction), a thermal expansion coefficient higher than that (in an axial direction) of the below-described clamping members 46*a* to 46*d*.

As described above, the current collection member 190 of this embodiment has an integral structure formed of the flat plate 190*p*, which is an aggregate of the connector abutment portions 190*a*. Accordingly, as shown in FIG. 25(*a*), the spacer 580 is formed from a single square material sheet having almost the same width as the flat plate 190*p* and a length slightly smaller than that of the flat plate 190*p* (specifically, smaller by a length corresponding to a single cell main body abutment portion 190*b* and a single connection portion 190*c*), so that portions each corresponding to a single row of the cell main body abutment portions 190*b* and the connection portions 190*c* are cut out to be arranged in a transverse lattice form.

Figure 24:
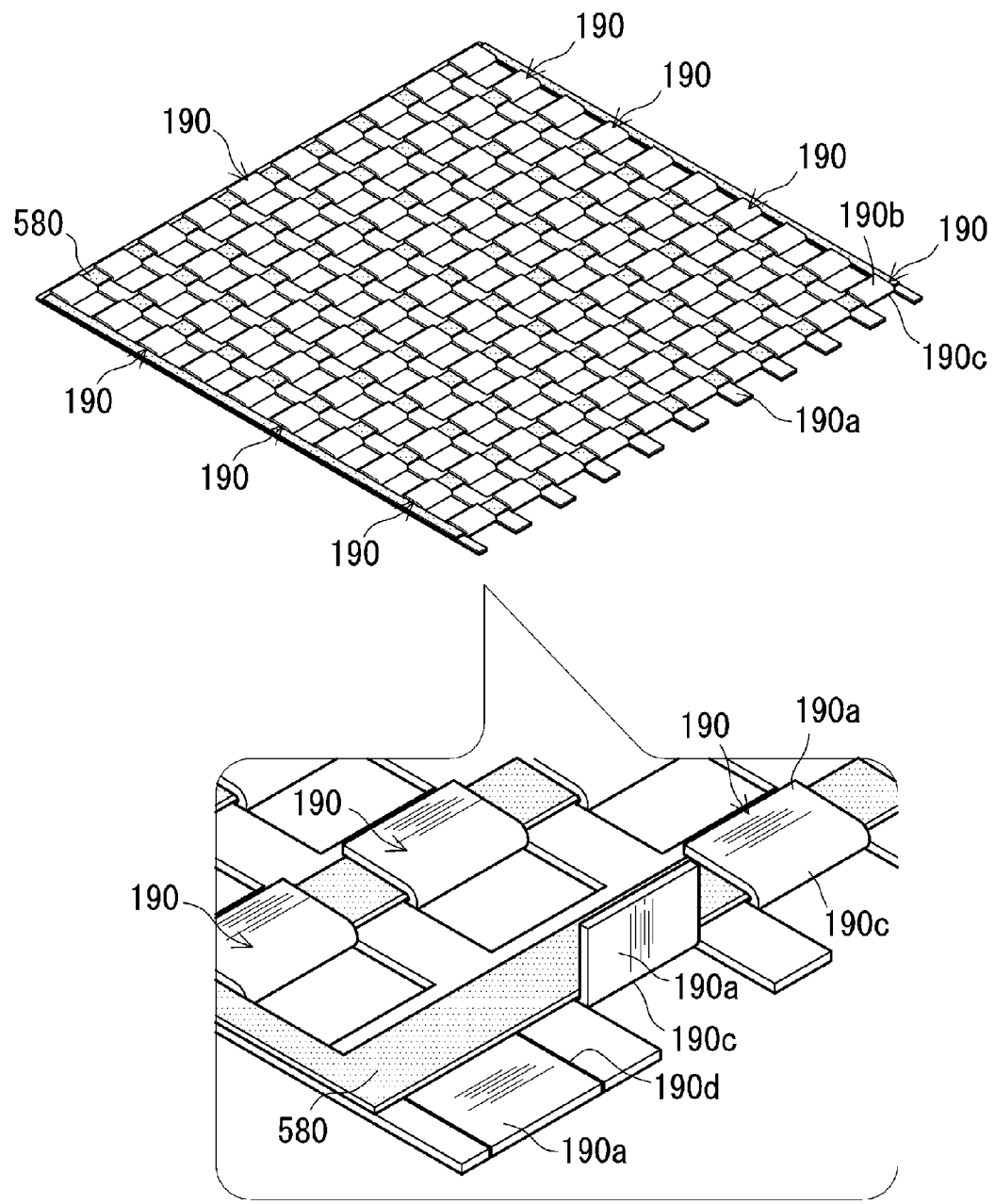
FIG. 24 is a perspective view of a current collection member according to Embodiment 3.
Figure 25:
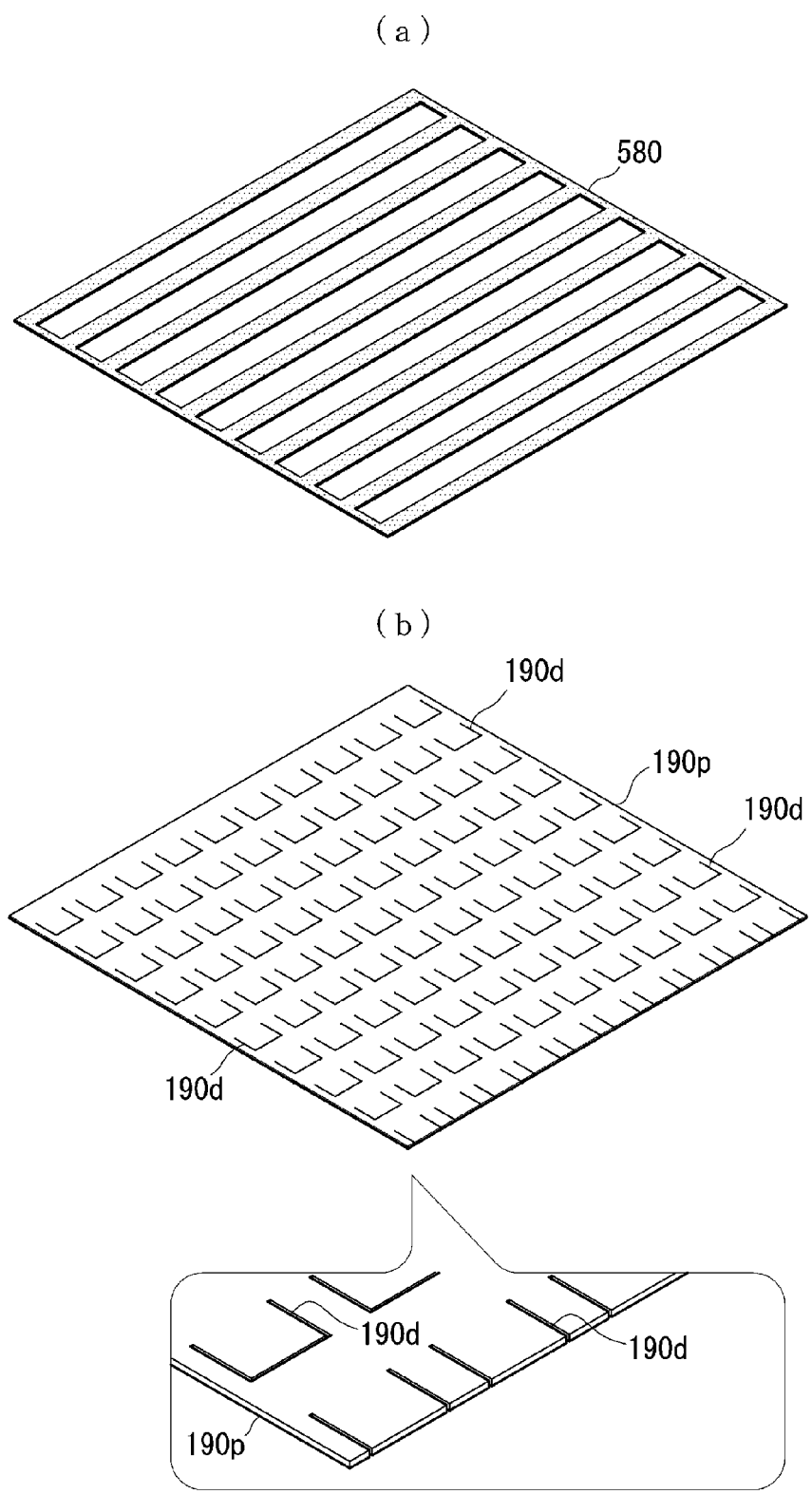
FIG. 25(a) is a perspective view of a spacer according to Embodiment 3.
FIG. 25(b) is a perspective view of the current collection member according to Embodiment 3 before attachment of the spacer.

The thus-formed spacer 580 is placed on the unprocessed flat plate 190*p* (of the current collection member 190) shown in FIG. 25(*b*). Then, as shown in FIG. 24 (enlarged view), the connection portions 190*c* are bent so as to have a U-shaped cross section, to thereby produce the current collection member 190 in which the spacer 580 is pre-integrated.

As shown in the enlarged view of FIG. 24, the cell main body abutment portions 190*b* are bent in a stepwise manner from the left corner toward to the right side. However, this figure is only for the purpose of describing the production procedure. Therefore, all the cell main body abutment portions 190*b* may be bent simultaneously, or the cell main body abutment portions 190*b* may be bent sequentially from a position convenient for processing.

[Air-Chamber-Side Current Collection Member]

The current collection member 180 toward the side of the air chamber 16 is formed of, for example, a dense electrically conductive member having an elongated squared timber shape (e.g., a stainless steel material). A plurality of the current collection members 180 are arranged in parallel at certain intervals so as to abut the cathode 14 on the upper surface of the electrolyte 2 and the lower surface (inner surface) of the upper interconnector 12. The current collection member 180 on the side toward the air chamber 16 may have the same structure as the current collection member 190 on the side toward the fuel chamber 17 (including the below-described Embodiment 4).

As described above, the fuel battery is subjected to repeated temperature cycles; i.e., elevation of temperature during power generation, and lowering of temperature during stop of power generation. Therefore, all the members forming the fuel chamber 17 or the air chamber 16 and the aforementioned clamping members 46*a* to 46*d* are subjected to repeated thermal expansion and contraction, and accordingly the size of the fuel chamber 17 or the air chamber 16 is increased and decreased repeatedly.

In some cases, fuel pressure or air pressure may vary, and the size of the fuel chamber 17 or the air chamber 16 may increase or decrease due to deformation of the cell main body 20 caused by a change in fuel or air pressure.

In the case of Embodiment 3, even when a change in size (increase in size) occurs in the fuel chamber 17 or the air chamber 16, since the current collection member 190 toward the side of the fuel chamber 17 presses the cell main body 20 by means of the elastic force (in a lamination direction; i.e., in a thickness direction or a clamping direction of the clamping members 46*a* to 46*d*) of only the spacer 580, and thermal expansion of the spacer 580 in the lamination direction, electric contact points are reliably maintained. Since pressing of the cell main body 20 by the current collection member 190 also affects the air chamber 16, electrical contact points in the air chamber 16 are also reliably maintained.

Meanwhile, even when a change in size (decrease in size) occurs in the fuel chamber 17 or the air chamber 16, stress applied to the cell main body 20 is relaxed by means of only contraction of the spacer 580 toward the side of the fuel chamber 17.

When the current collection member 190 toward the side of the anode 15 is formed of Ni or an Ni alloy, the cell main body abutment portion 190*b* is diffusion-bonded to and integrated with Ni contained in the anode 15 at high temperature during power generation. Therefore, electrical connection is more reliably maintained by means of the current collection member 190.

Preferably, a bonding layer is formed on the anode 15 by applying an NiO paste thereto. In such a case, since NiO is converted to Ni through application of electricity in the presence of $H_2$, the bondability between the current collection member 190 and the anode 15 is further improved. The bonding layer may be formed by applying a Pt paste to the anode 15.

In Embodiment 3, the flat plate 190*p* (i.e., an aggregate of the connector abutment portions 190*a*) is bonded to the lower interconnector 13 through welding. However, when the interconnector 13 and the flat plate 190*p* are formed of a combination of materials (e.g., Crofer22H and Ni) which can be diffusion-bonded to each other at high temperature during power generation, or when the aforementioned bonding layer is formed on the inner surface of the lower interconnector 13, the interconnector 13 can be bonded to and integrated with the current collection member 190 at high temperature during power generation.

Embodiment 4

Figure 28:
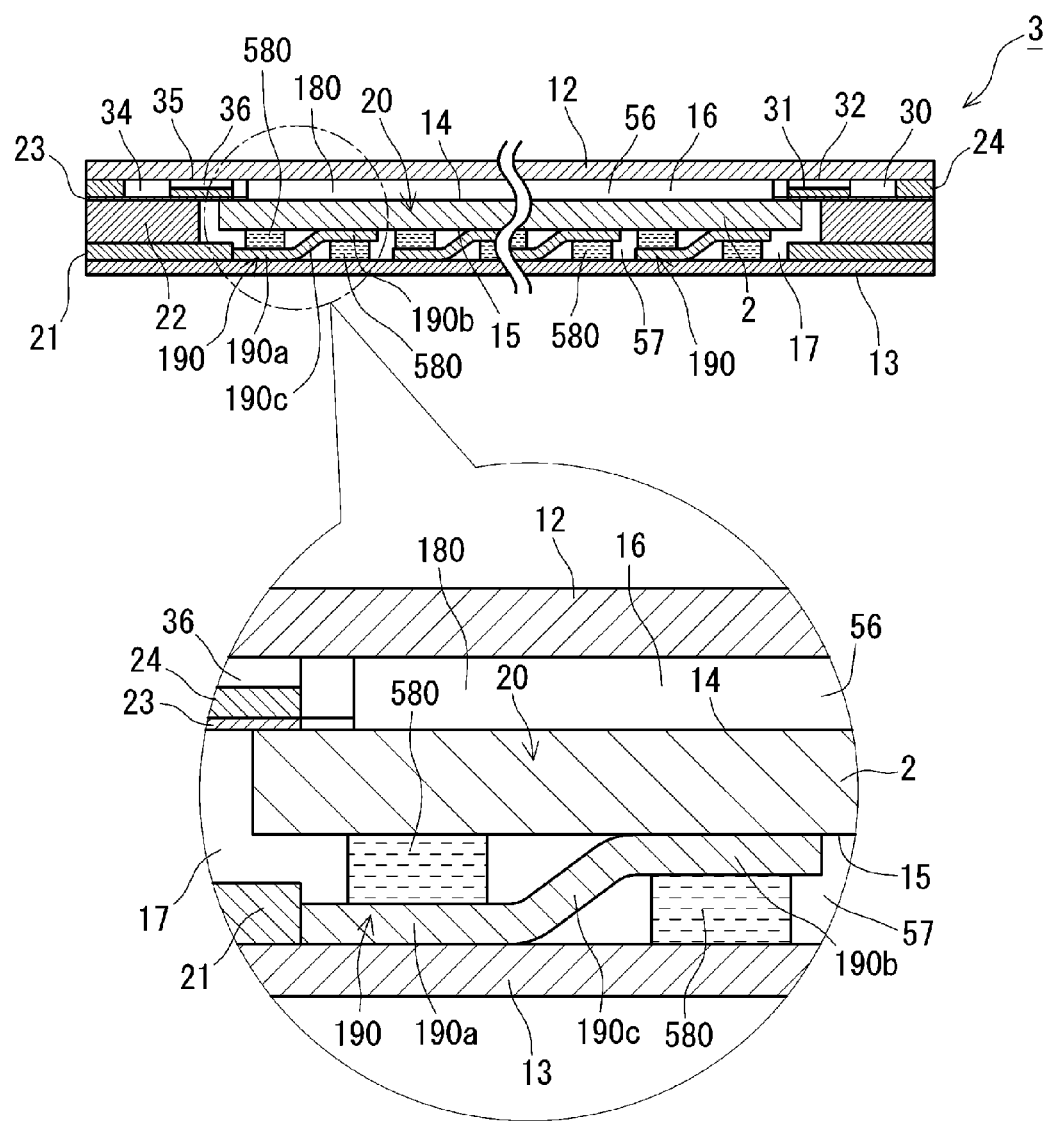
FIG. 28 is an intermediate-omitted, vertical cross-sectional view of a fuel cell according to another embodiment (Embodiment 4).
Figure 29:
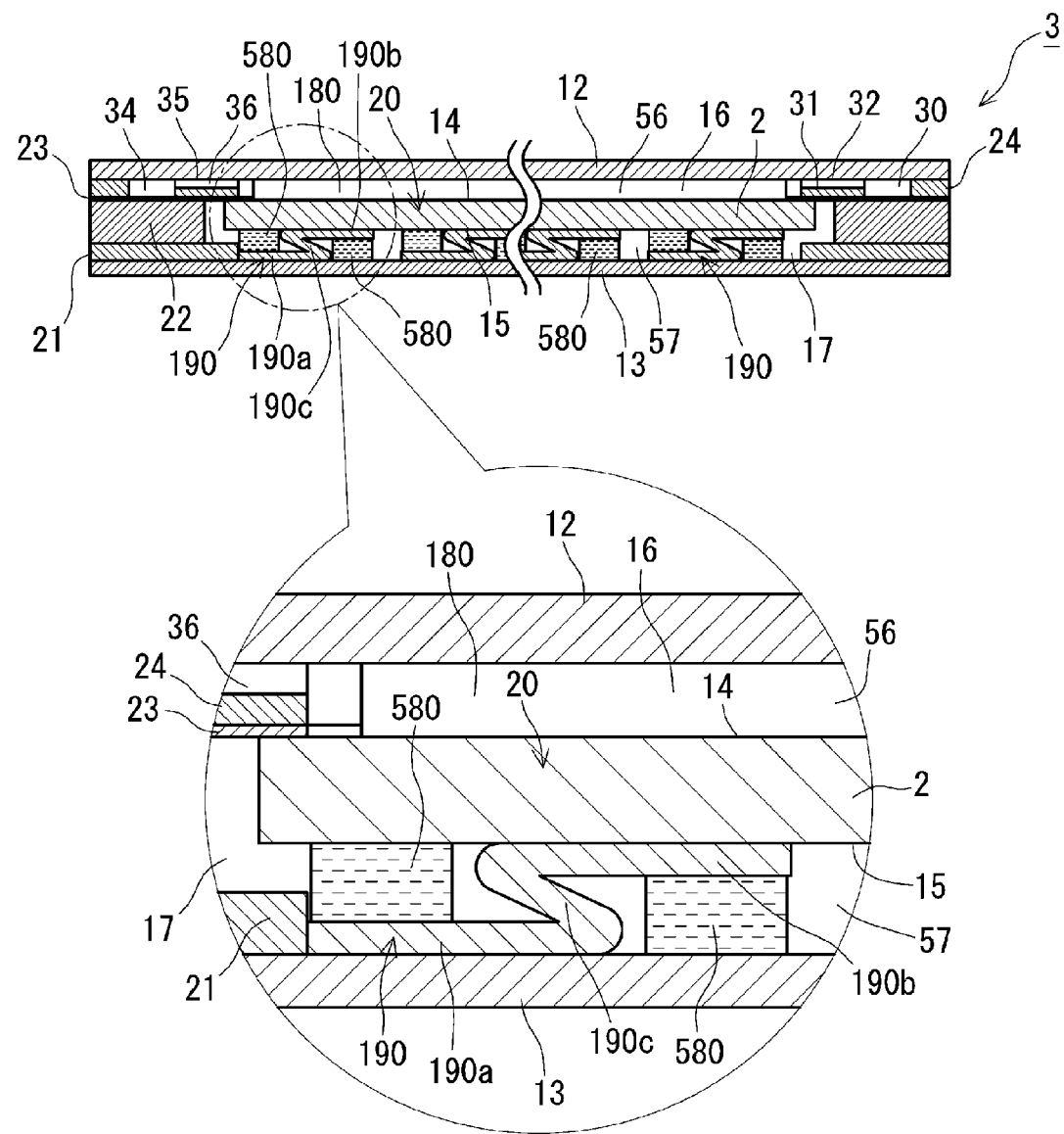
FIG. 29 is an intermediate-omitted, vertical cross-sectional view of a fuel cell according to yet another embodiment (Embodiment 4).
Figure 30:
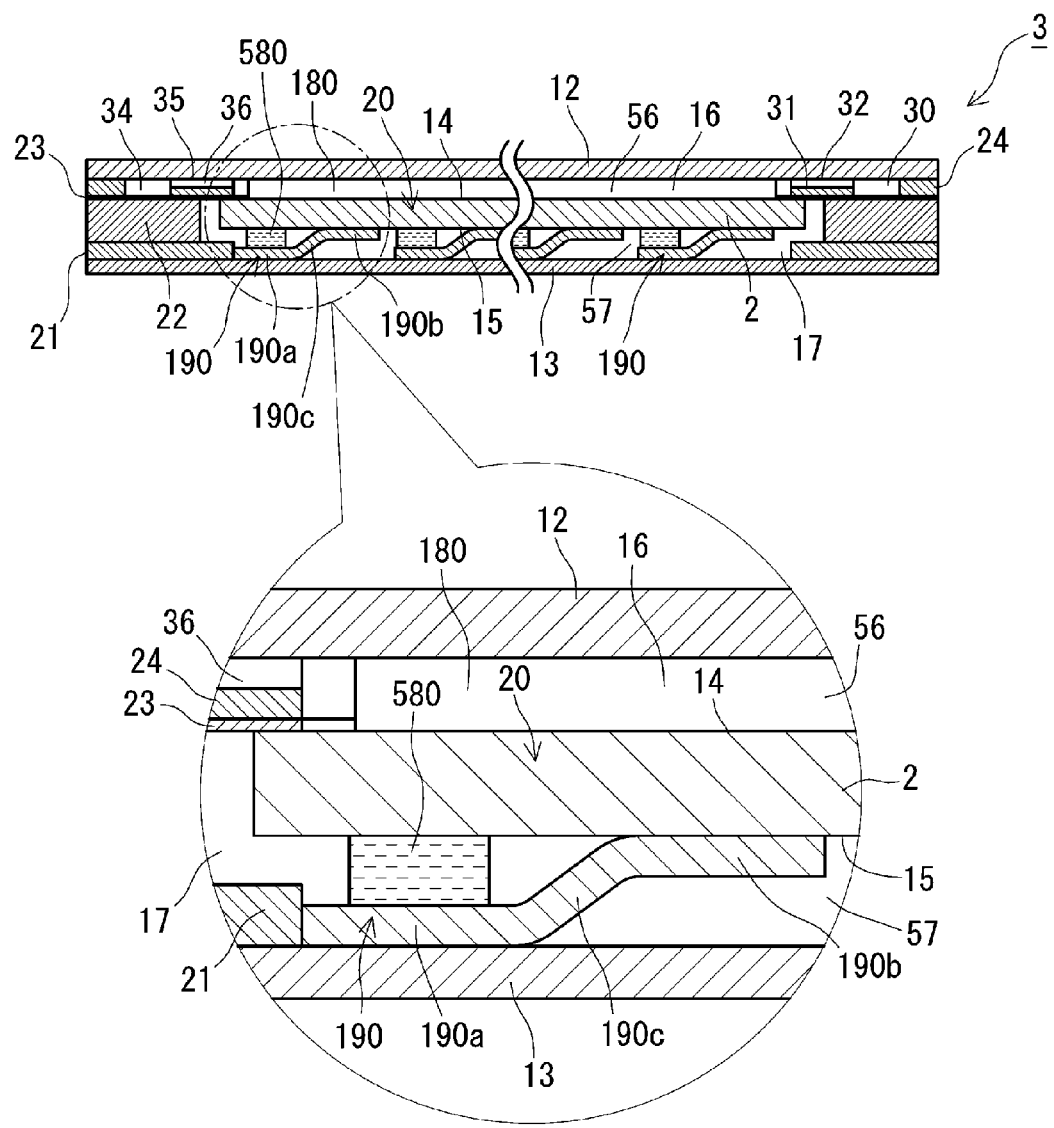
FIG. 30 is an intermediate-omitted, vertical cross-sectional view of a fuel cell according to yet another embodiment (Embodiment 4).
Figure 31:
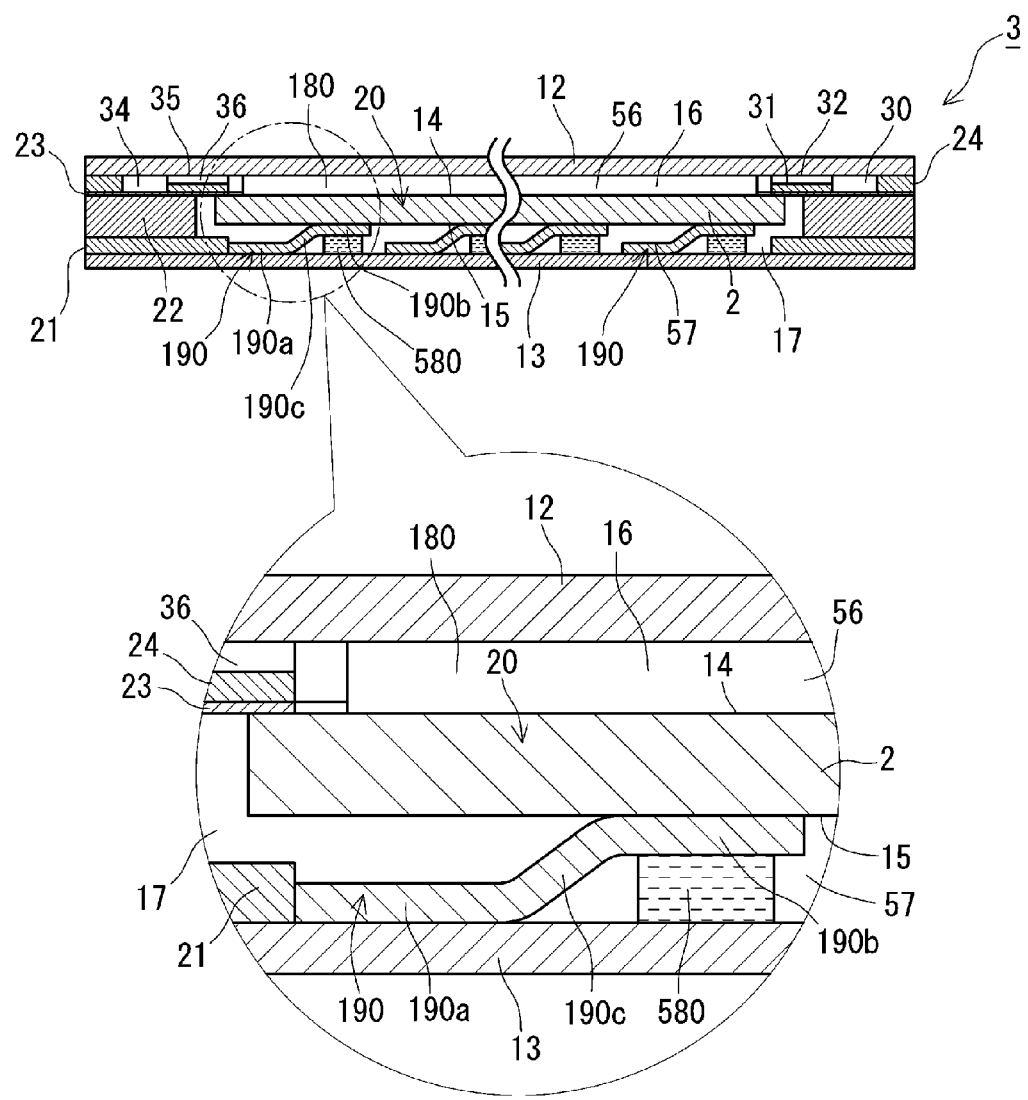
FIG. 31 is an intermediate-omitted, vertical cross-sectional view of a fuel cell according to yet another embodiment (Embodiment 4).

FIGS. 28 to 31 are intermediate-omitted, vertical cross-sectional views of a fuel cell 3 according to Embodiment 4. In Embodiment 3, the connection portion 190*c* of the current collection member 190 is bent so as to have a U-shaped cross section; the cell main body abutment portion 190*b* is provided above the connector abutment portion 190*a*; and the spacer 580 is provided between the connector abutment portion 190*a* and the cell main body abutment portion 190*b*. In contrast, in Embodiment 4, as shown in FIG. 28, the connection portion 190*c* is provided so as to extend obliquely such that the positions (in a vertical direction) of the connector abutment portion 190*a* and the cell main body abutment portion 190*b* completely differ from each other. Alternatively, as shown in FIG. 29, the current collection member 190 is provided so as to have a generally Z-shaped cross section such that the connector abutment portion 190*a* and the cell main body abutment portion 190*b* partially overlap with each other in a vertical direction and also differ in vertical position from each other. The spacers 580 are provided so as to separate the connector abutment portion 190*a* from the cell main body 20 and to separate the cell main body abutment portion 190*b* from the interconnector 13. Alternatively, as shown in FIG. 30, the spacer 580 may be provided so as to separate the connector abutment portion 190*a* from the cell main body 20, or, as shown in FIG. 31, the spacer 580 may be provided so as to separate the cell main body abutment portion 190*b* from the interconnector 13.

The fuel battery of Embodiment 4 has the same configuration as that of Embodiment 3, except for the above-described differences. Therefore, detailed description of the fuel battery of Embodiment 4 is omitted.

It will be apparent that various embodiments may be made without departing from the technical idea of the present invention. Thus, the present invention is not limited to specific embodiments, although the scope of the invention is limited by the appended claims.

DESCRIPTION OF REFERENCE NUMERALS

1: fuel battery
2: electrolyte
3: fuel cell
8: fuel cell stack
12, 13: interconnector
14: cathode
15: anode
18, 19: current collection member
19a: connector abutment portion
19b: cell main body abutment portion
19c: connection portion
20: cell main body
46a to 46d: clamping member
58: spacer
180, 190: current collection member
190a: connector abutment portion
190b: cell main body abutment portion
190c: connection portion 19c→190c
190d: pre-cut line
190p: flat plate
580: spacer

The invention claimed is:

1. A fuel cell stack configured that a plurality of fuel cells are stacked, each of the fuel cells comprising:
a pair of interconnectors facing each other;
one and not more than one cell main body which is provided between the interconnectors facing each other and is formed of ceramic material and which includes an electrolyte, a cathode formed on one surface of the electrolyte, and an anode formed on the other surface of the electrolyte; and
a current collection member which is provided between at least one of the cathode and the anode, and the interconnector, and which electrically connects the cathode and/or the anode, and the interconnector, the fuel cell stack being characterized in that:
the current collection member has a connector abutment portion which abuts the interconnector, a cell main body abutment portion which abuts the cell main body, and a connection portion which connects the connector abutment portion and the cell main body abutment portion, the portions being continuously formed;
between the cell main body and the interconnector, a spacer is provided so as to separate the connector abutment portion and the cell main body abutment portion from each other; and
the current collection member and the spacer are provided between the cell main body and the interconnector,
wherein the spacer is in direct contact with at least one of the cell main body abutment portion and the connector abutment portion,
wherein (i) the cell main body abutment portion is in direct contact with the cell main body or (ii) a bonding layer is provided between and in direct contact with the cell main body abutment portion and the cell main body.

2. A fuel cell stack according to claim 1, wherein the connection portion is bent at about 180°, and the connector abutment portion and the cell main body abutment portion are provided on opposite sides of the spacer.

3. A fuel cell stack according to claim 1, wherein the spacer is more flexible than the current collection member with respect to a load which can occur in association with a change in distance between the cell main body and the interconnector.

4. A fuel cell stack according to claim 1, which further comprises a clamping member which integrally clamps the interconnector, the cell main body, and the current collection member, wherein, by means of the clamping member and the spacer, the cell main body abutment portion of the current collection member is pressed to abut the cell main body, and/or the connector abutment portion is pressed to abut the interconnector.

5. A fuel cell stack according to claim 4, wherein the spacer exhibits, in a clamping direction, a thermal expansion coefficient higher than that of the clamping member.

6. A fuel cell stack according to claim 1, wherein the current collection member is formed of porous metal, metallic mesh, wire, or punching metal.

7. A fuel cell stack according to claim 1, wherein the cell main body abutment portion of the current collection member is bonded to the surface of the cathode and/or the anode of the cell main body.

8. A fuel cell stack according to claim 1, wherein the connector abutment portion of the current collection member is bonded to the interconnector.

9. A fuel cell stack according to claim 1, wherein the current collection member is provided between the anode and the interconnector, and is formed of Ni or an Ni alloy.

10. A fuel cell stack according to claim 1, the fuel cells being stacked and fixed together by means of a clamping member.

11. A fuel cell stack configured that a plurality of fuel cells are stacked, each of the fuel cells comprising:
a pair of interconnectors facing each other;
one and not more than one cell main body which is provided between the interconnectors facing each other and is formed of ceramic material, and which includes an electrolyte, a cathode formed on one surface of the electrolyte, and an anode formed on the other surface of the electrolyte; and
a current collection member which is provided between at least one of the cathode and the anode, and the interconnector, and which electrically connects the cathode and/or the anode, and the interconnector, the fuel cell stack being characterized in that:
the current collection member has a connector abutment portion which abuts the interconnector, a cell main body abutment portion which abuts the cell main body, and a connection portion which connects the connector abutment portion and the cell main body abutment portion, the portions being continuously formed;
between the cell main body and the interconnector, a spacer is provided so as to separate the connector abutment portion and the cell main body from each other, and the spacer is also provided so as to separate the cell main body abutment portion and the interconnector from each other;
the current collection member and the spacer are provided between the cell main body and the interconnector; and
the spacer is provided so as to separate at least one of: (a) the connector abutment portion and the cell main body, and (b) the cell main body abutment portion and the interconnector,
wherein the spacer is in direct contact with at least one of the cell main body abutment portion and the connector abutment portion,
wherein (i) the cell main body abutment portion is in direct contact with the cell main body or (ii) a bonding layer is provided between and in direct contact with the cell main body abutment portion and the cell main body.

12. A fuel cell stack according to claim 11, wherein the spacer is more flexible than the current collection member with respect to a load which can occur in association with a change in distance between the cell main body and the interconnector.

13. A fuel cell stack according to claim 11, which further comprises a clamping member which integrally clamps the interconnector, the cell main body, and the current collection member, wherein, by means of the clamping member and the spacer, the cell main body abutment portion of the current collection member is pressed to abut the cell main body, and/or the connector abutment portion is pressed to abut the interconnector.

14. A fuel cell stack according to claim 13, wherein the spacer exhibits, in a clamping direction, a thermal expansion coefficient higher than that of the clamping member.

15. A fuel cell stack according to claim 11, wherein the current collection member is formed of porous metal, metallic mesh, wire, or punching metal.

16. A fuel cell stack according to claim 11, wherein the cell main body abutment portion of the current collection member is bonded to the surface of the cathode and/or the anode of the cell main body.

17. A fuel cell stack according to claim 11, wherein the connector abutment portion of the current collection member is bonded to the interconnector.

18. A fuel cell stack according to claim 11, wherein the current collection member is provided between the anode and the interconnector, and is formed of Ni or an Ni alloy.

19. A fuel cell stack according to claim 11, the fuel cells being stacked and fixed together by means of a clamping member.

20. A fuel cell stack configured that a plurality of fuel cells are stacked, each of the fuel cells comprising:
   a pair of interconnectors facing each other;
   one and not more than one cell main body which is provided between the interconnectors facing each other so as to be a distance away from each of the interconnectors, and is formed of ceramic material and which includes a plate-like electrolyte, and electrodes provided on upper and lower surfaces of the electrolyte; and
   a current collection member which is provided between at least one of the electrodes, and the interconnector, and which electrically connects the electrode and the interconnector, the fuel cell stack being characterized in that:
   the current collection member has a connector abutment portion which abuts the interconnector, a cell main body abutment portion which abuts the electrode of the cell main body, and a connection portion which connects the connector abutment portion and the cell main body abutment portion, the portions being continuously formed;
   a spacer is provided between the connector abutment portion and the cell main body abutment portion;
   each of the current collection member and the spacer exhibits elasticity in a direction of increasing the distance between the cell main body and the interconnector, and the elastic deformation of the spacer is greater than that of the current collection member; and
   the current collection member and the spacer are provided between the cell main body and the interconnector,
   wherein the spacer is in direct contact with at least one of the cell main body abutment portion and the connector abutment portion,
   wherein (i) the cell main body abutment portion is in direct contact with the electrode of the cell main body or (ii) a bonding layer is provided between and in direct contact with the cell main body abutment portion and the electrode of the cell main body.

21. A fuel cell stack according to claim 20, wherein the connection portion is bent at about 180°, and the connector abutment portion and the cell main body abutment portion are provided on opposite sides of the spacer.

22. A fuel cell stack according to claim 20, wherein the current collection member is formed so as to be bendable and stretchable in a direction crossing with the surface direction thereof, and to generate virtually no resistive force against bending or stretching.

23. A fuel cell stack according to claim 20, wherein the spacer is formed of at least one species selected from among mica, alumina felt, vermiculite, carbon fiber, silicon carbide fiber, and silica.

24. A fuel cell stack according to claim 20, which further comprises a clamping member which integrally clamps the interconnector, the cell main body, and the current collection member, wherein, by means of the clamping member and the spacer, the cell main body abutment portion of the current collection member is pressed to abut the cell main body, and/or the connector abutment portion is pressed to abut the interconnector.

25. A fuel cell stack according to claim 24, wherein the spacer exhibits, in a clamping direction, a thermal expansion coefficient higher than that of the clamping member.

26. A fuel cell stack according to claim 20, wherein the current collection member is formed of porous metal, metallic mesh, wire, or punching metal.

27. A fuel cell stack according to claim 20, wherein the cell main body abutment portion of the current collection member is bonded to the surface of the cathode and/or the anode of the cell main body.

28. A fuel cell stack according to claim 20, wherein the connector abutment portion of the current collection member is bonded to the interconnector.

29. A fuel cell stack according to claim 20, wherein the current collection member is provided between the anode and the interconnector, and is formed of Ni or an Ni alloy.

30. A fuel cell stack according to claim 20, the fuel cells being stacked and fixed together by means of a clamping member.

31. A fuel cell stack configured that a plurality of fuel cells are stacked, each of the fuel cells comprising:
   a pair of interconnectors facing each other;
   one and not more than one cell main body which is provided between the interconnectors facing each other so as to be a distance away from each of the interconnectors, and is formed of ceramic material and which includes a plate-like electrolyte, and electrodes provided on upper and lower surfaces of the electrolyte; and
   a current collection member which is provided between at least one of the electrodes, and the interconnector, and which electrically connects the electrode and the interconnector, the fuel cell stack being characterized in that:
   the current collection member has a connector abutment portion which abuts the interconnector, a cell main body abutment portion which abuts the electrode of the cell main body, and a connection portion which connects the connector abutment portion and the cell main body abutment portion, the portions being continuously formed;

a spacer is provided between the connector abutment portion and the cell main body, and the spacer is also provided between the cell main body abutment portion and the interconnector;

each of the current collection member and the spacer exhibits elasticity in a direction of increasing the distance between the cell main body and the interconnector, and the elastic deformation of the spacer is greater than that of the current collection member;

the current collection member and the spacer are provided between the cell main body and the interconnector; and the spacer is provided so as to separate at least one of: (a) the connector abutment portion and the cell main body, and (b) the cell main body abutment portion and the interconnector, wherein the spacer is in direct contact with at least one of the cell main body abutment portion and the connector abutment portion, wherein (i) the cell main body abutment portion is in direct contact with the electrode of the cell main body or (ii) a bonding layer is provided between and in direct contact with the cell main body abutment portion and the electrode of the cell main body.

32. A fuel cell stack according to claim 31, wherein the current collection member is formed so as to be bendable and stretchable in a direction crossing with the surface direction thereof, and to generate virtually no resistive force against bending or stretching.

33. A fuel cell stack according to claim 31, wherein the spacer is formed of at least one species selected from among mica, alumina felt, vermiculite, carbon fiber, silicon carbide fiber, and silica.

34. A fuel cell stack according to claim 31, which further comprises a clamping member which integrally clamps the interconnector, the cell main body, and the current collection member, wherein, by means of the clamping member and the spacer, the cell main body abutment portion of the current collection member is pressed to abut the cell main body, and/or the connector abutment portion is pressed to abut the interconnector.

35. A fuel cell stack according to claim 34, wherein the spacer exhibits, in a clamping direction, a thermal expansion coefficient higher than that of the clamping member.

36. A fuel cell stack according to claim 31, wherein the current collection member is formed of porous metal, metallic mesh, wire, or punching metal.

37. A fuel cell stack according to claim 31, wherein the cell main body abutment portion of the current collection member is bonded to the surface of the cathode and/or the anode of the cell main body.

38. A fuel cell stack according to claim 31, wherein the connector abutment portion of the current collection member is bonded to the interconnector.

39. A fuel cell stack according to claim 31, wherein the current collection member is provided between the anode and the interconnector, and is formed of Ni or an Ni alloy.

40. A fuel cell stack according to claim 31, the fuel cells being stacked and fixed together by means of a clamping member.

* * * * *